(12) United States Patent
Dickie

(10) Patent No.: US 10,817,495 B2
(45) Date of Patent: Oct. 27, 2020

(54) SYSTEMS AND METHODS FOR PERFORMING DATA PROCESSING OPERATIONS USING VARIABLE LEVEL PARALLELISM

(71) Applicant: Ab Initio Technology LLC, Lexington, MA (US)

(72) Inventor: Garth Allen Dickie, Framingham, MA (US)

(73) Assignee: Ab Inito Technology LLC, Lexington, MA (US)

( * ) Notice: Subject to any disclaimer, the term of this patent is extended or adjusted under 35 U.S.C. 154(b) by 248 days.

(21) Appl. No.: 15/939,820

(22) Filed: Mar. 29, 2018

(65) Prior Publication Data

US 2018/0285401 A1 Oct. 4, 2018

Related U.S. Application Data

(60) Provisional application No. 62/478,390, filed on Mar. 29, 2017.

(51) Int. Cl.
*G06F 17/00* (2019.01)
*G06F 16/22* (2019.01)
(Continued)

(52) U.S. Cl.
CPC ........ *G06F 16/2282* (2019.01); *G06F 9/5066* (2013.01); *G06F 16/2379* (2019.01); *G06F 16/2455* (2019.01)

(58) Field of Classification Search
CPC ............. G06F 16/2282; G06F 16/2379; G06F 16/2455; G06F 9/5066; G06F 16/1727; G06F 16/13; G06F 16/18
See application file for complete search history.

(56) References Cited

U.S. PATENT DOCUMENTS 5,966,072 A * 10/1999 Stanfill ..................... G06F 9/54
340/440
7,716,630 B2  5/2010 Wholey et al.
(Continued)

FOREIGN PATENT DOCUMENTS

EP          2657860 A1   10/2013
WO   WO 2014/209260 A1   12/2014
WO   WO 2017/024164 A1    2/2017

OTHER PUBLICATIONS

International Search Report and Written Opinion for International Application No. PCT/US2018/064217 dated Mar. 13, 2019.
(Continued)

*Primary Examiner* — Greta L Robinson
(74) *Attorney, Agent, or Firm* — Wolf, Greenfield & Sacks, P.C.

(57) ABSTRACT

Techniques for determining processing layouts to nodes of a dataflow graph. The techniques include: obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising: a first set of one or more nodes; and a second set of one or more nodes disjoint from the first set of nodes; obtaining a first set of one or more processing layouts for the first set of nodes; and determining a processing layout for each node in the second set of nodes based on the first set of processing layouts and one or more layout determination rules, the one or more layout determination rules including at least one rule for selecting among processing layouts having different degrees of parallelism.

30 Claims, 12 Drawing Sheets

(51) Int. Cl.
*G06F 16/23* (2019.01)
*G06F 16/2455* (2019.01)
*G06F 9/50* (2006.01)

(56) References Cited

U.S. PATENT DOCUMENTS

| | | | |
|---|---|---|---|
| 8,195,643 | B2 | 6/2012 | Weyerhaeuser et al. |
| 8,838,579 | B2 | 9/2014 | Weyerhaeuser et al. |
| 9,116,955 | B2 | 8/2015 | Schechter et al. |
| 9,208,141 | B2 | 12/2015 | Chan et al. |
| 9,798,527 | B1 | 10/2017 | Bendersky et al. |
| 2003/0163512 | A1* | 8/2003 | Mikamo ............... G06F 8/451 718/102 |
| 2004/0220942 | A1* | 11/2004 | Agrawal ............ G06F 16/284 |
| 2004/0250098 | A1 | 12/2004 | Licis |
| 2007/0271381 | A1 | 11/2007 | Wholey et al. |
| 2008/0140622 | A1 | 6/2008 | Bestgen et al. |
| 2011/0055426 | A1* | 3/2011 | Lakshmanan ........ G06F 9/5066 709/242 |
| 2011/0197122 | A1 | 8/2011 | Chan et al. |
| 2012/0089595 | A1* | 4/2012 | Jaecksch ........ G06F 16/24542 707/714 |
| 2012/0284255 | A1 | 11/2012 | Schechter et al. |
| 2014/0033173 | A1* | 1/2014 | Frenkiel ................ G06F 8/74 717/123 |
| 2019/0179723 | A1 | 6/2019 | Allin et al. |

OTHER PUBLICATIONS

[No Author Listed], ApexSQL Plan 2017—Screen Shot Tour. Jun. 25, 2017. Retrieved from the Internet: https://web.archive.org/web/20170625041627/https://blog.apexsql.com/apexsql-plan-2017-screen-shot-tour/ [retrieved on Feb. 27, 2019] 18 pages.

International Search Report and Written Opinion dated Jun. 21, 2018 in connection with International Application No. PCT/US2018/025144.

[No Author Listed], Using Oracle Database Cloud Service Viewing Real Time SQL Monitor. Oracle Database Cloud Service. Help Center. 2016.

Farina, SQL Server 2014 Real Time Query Monitoring. Zero to Hero: 12 Tips for the Accidental DBA. Last update Sep. 9, 2014; 7 pages.

Koltakov, Real-Time SQL Monitoring. Oracle. Dec. 2009; 30 pages.

International Search Report and Written Opinion for International Application No. PCT/US2019/033573 dated Jul. 26, 2019.

* cited by examiner

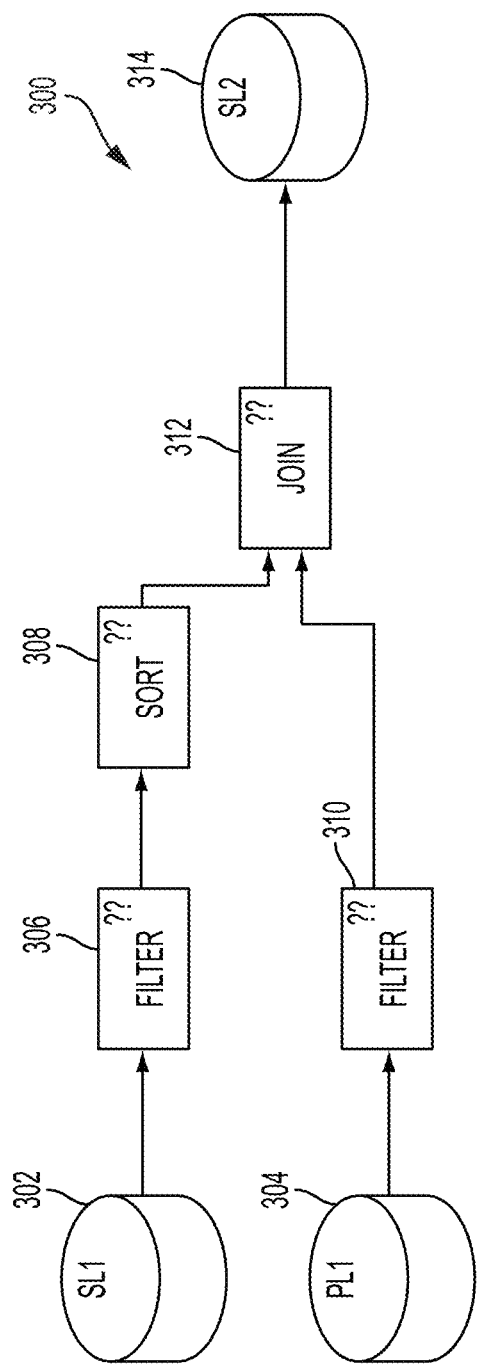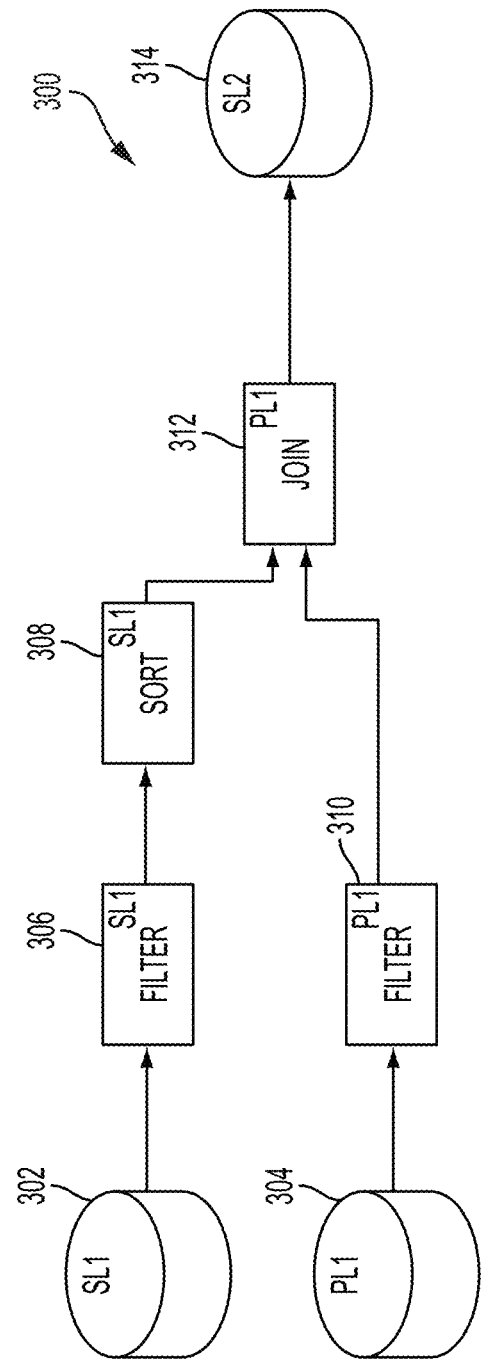

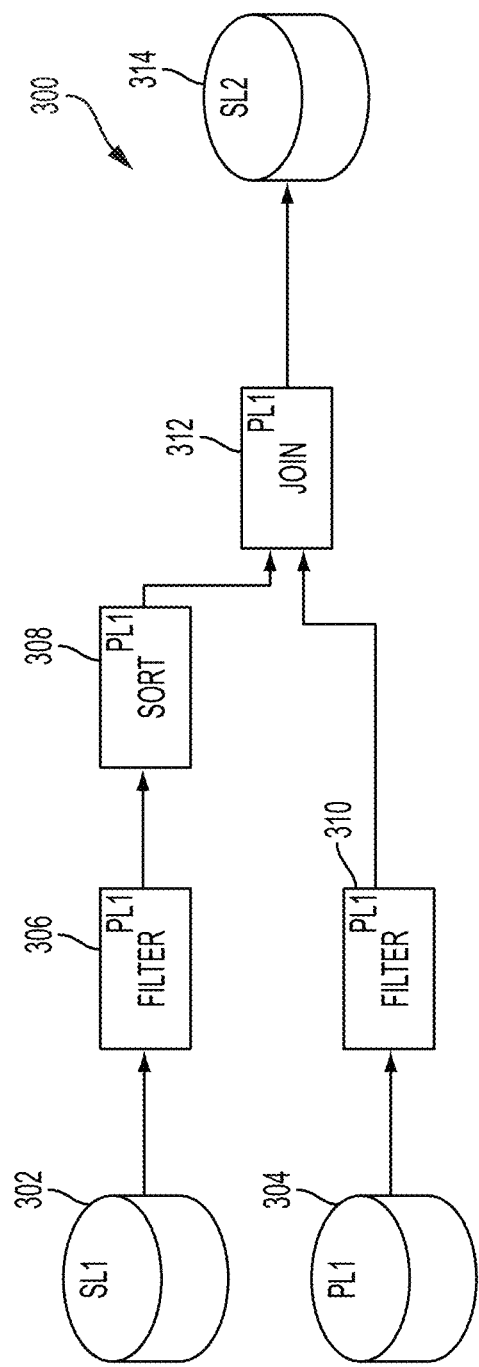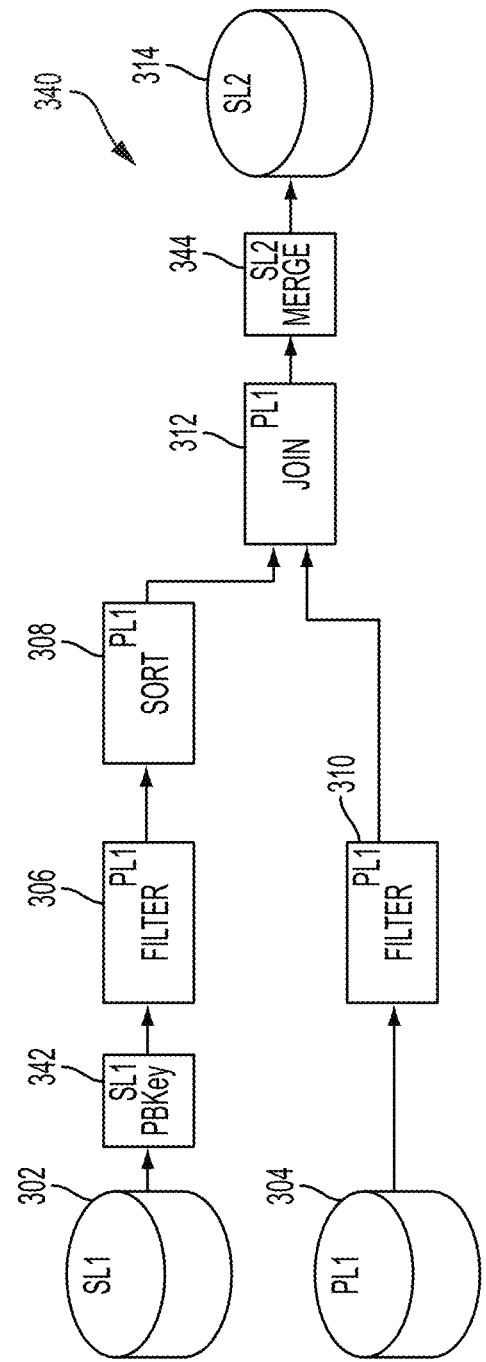

SYSTEMS AND METHODS FOR PERFORMING DATA PROCESSING OPERATIONS USING VARIABLE LEVEL PARALLELISM

CROSS-REFERENCE TO RELATED APPLICATIONS

This application claims the benefit under 35 U.S.C. § 119(e) of U.S. Provisional Application Ser. No. 62/478,390, titled "SYSTEMS AND METHODS FOR PERFORMING DATA PROCESSING OPERATIONS USING VARIABLE LEVEL PARALLELISM", filed on Mar. 29, 2017, which is incorporated by reference herein in its entirety.

BACKGROUND

A data processing system may use one or more computer programs to process data. One or more of the computer programs utilized by the data processing system may be developed as dataflow graphs. A dataflow graph may include components, termed "nodes" or "vertices," representing data processing operations to be performed on input data and links between the components representing flows of data. Nodes of a dataflow graph may include one or more input nodes representing respective input datasets, one or more output nodes representing respective output datasets, and one or more nodes representing data processing operations to be performed on data. Techniques for executing computations encoded by dataflow graphs are described in U.S. Pat. No. 5,966,072, titled "Executing Computations Expressed as Graphs," and in U.S. Pat. No. 7,716,630, titled "Managing Parameters for Graph-Based Computations," each of which is incorporated by reference herein in its entirety.

SUMMARY

Some embodiments are directed to a data processing system. The data processing system comprises at least one computer hardware processor; and at least one non-transitory computer readable storage medium storing processor executable instructions that, when executed by the at least one computer hardware processor, cause the at least one computer hardware processor to perform: (A) obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising: a first set of one or more nodes, each node in the first set of nodes representing a respective input dataset in a set of one or more input datasets; a second set of one or more nodes, each node in the second set of nodes representing a respective output dataset in a set of one or more output datasets; and a third set of one or more nodes, each node in the third set of nodes representing at least one respective data processing operation; (B) obtaining a first set of one or more processing layouts for the set of input datasets; (C) obtaining a second set of one or more processing layouts for the set of output datasets; and (D) determining a processing layout for each node in the third set of nodes based on the first set of processing layouts, the second set of processing layouts, and one or more layout determination rules, the one or more layout determination rules including at least one rule for selecting among processing layouts having different degrees of parallelism.

Some embodiments are directed to at least one non-transitory computer readable storage medium storing processor executable instructions that, when executed by the at least one computer hardware processor, cause the at least one computer hardware processor to perform: (A) obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising: a first set of one or more nodes, each node in the first set of nodes representing a respective input dataset in a set of one or more input datasets; a second set of one or more nodes, each node in the second set of nodes representing a respective output dataset in a set of one or more output datasets; and a third set of one or more nodes, each node in the third set of nodes representing at least one respective data processing operation; (B) obtaining a first set of one or more processing layouts for the set of input datasets; (C) obtaining a second set of one or more processing layouts for the set of output datasets; and (D) determining a processing layout for each node in the third set of nodes based on the first set of processing layouts, the second set of processing layouts, and one or more layout determination rules, the one or more layout determination rules including at least one rule for selecting among processing layouts having different degrees of parallelism.

Some embodiments are directed to at least one non-transitory computer readable storage medium storing processor executable instructions that, when executed by the at least one computer hardware processor, the processor executable instructions comprising: (A) means for obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising: a first set of one or more nodes, each node in the first set of nodes representing a respective input dataset in a set of one or more input datasets; a second set of one or more nodes, each node in the second set of nodes representing a respective output dataset in a set of one or more output datasets; and a third set of one or more nodes, each node in the third set of nodes representing at least one respective data processing operation; (B) means for obtaining a first set of one or more processing layouts for the set of input datasets; (C) means for obtaining a second set of one or more processing layouts for the set of output datasets; and (D) means for determining a processing layout for each node in the third set of nodes based on the first set of processing layouts, the second set of processing layouts, and one or more layout determination rules, the one or more layout determination rules including at least one rule for selecting among processing layouts having different degrees of parallelism.

Some embodiments are directed to a method comprising using at least one computer hardware processor to perform: (A) obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising: a first set of one or more nodes, each node in the first set of nodes representing a respective input dataset in a set of one or more input datasets; a second set of one or more nodes, each node in the second set of nodes representing a respective output dataset in a set of one or more output datasets; and a third set of one or more nodes, each node in the third set of nodes representing at least one respective data processing operation; (B) obtaining a first set of one or more processing layouts for the set of input datasets; (C) obtaining a second set of one or more processing layouts for the set of output datasets; and (D) determining a processing layout for each node in the third set of nodes based on the first set of processing layouts, the second set of processing layouts, and one or more layout determination rules, the one or more layout determination rules including at least one rule for selecting among processing layouts having different degrees of parallelism.

Some embodiments are directed to a data processing system. The data processing system comprises at least one computer hardware processor; and at least one non-transitory computer readable storage medium storing processor executable instructions that, when executed by the at least one computer hardware processor, cause the at least one computer hardware processor to perform: (A) obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising: a first set of one or more nodes; and a second set of one or more nodes disjoint from the first set of nodes; (B) obtaining a first set of one or more processing layouts for the first set of nodes; and (C) determining a processing layout for each node in the second set of nodes based on the first set of processing layouts and one or more layout determination rules, the one or more layout determination rules including at least one rule for selecting among processing layouts having different degrees of parallelism.

Some embodiments are directed to data processing system. The data processing system comprises: at least one computer hardware processor; and at least one non-transitory computer readable storage medium storing processor executable instructions that, when executed by the at least one computer hardware processor, cause the at least one computer hardware processor to perform: (A) obtaining computer code that, when executed by the at least one computer hardware processor, causes the at least one computer hardware processor to execute a database query, wherein the computer code comprises: a first set of one or more computer code portions each representing a data processing operation for reading in a respective input dataset; a second set of one or more computer code portions each representing a data processing operation for writing out a respective output dataset; a third set of one or more computer code portions each representing a respective data processing operation; (B) obtaining a first set of one or more processing layouts for one or more code portions in the first set of code portions; (C) obtaining a second set of one or more processing layouts for one or more code portions in the second set of code portions; and (D) determining a processing layout for each code portion in the third set of code portions based on the first set of processing layouts, the second set of processing layouts, and one or more layout determination rules including at least one rule for selecting among processing layouts having different degrees of parallelism.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIGS. 3A-3D illustrate determining processing layouts for nodes of an illustrative dataflow graph using one or more processing layout determination rules, in accordance with some embodiments of the technology described herein.

DETAILED DESCRIPTION

Figure 1A:
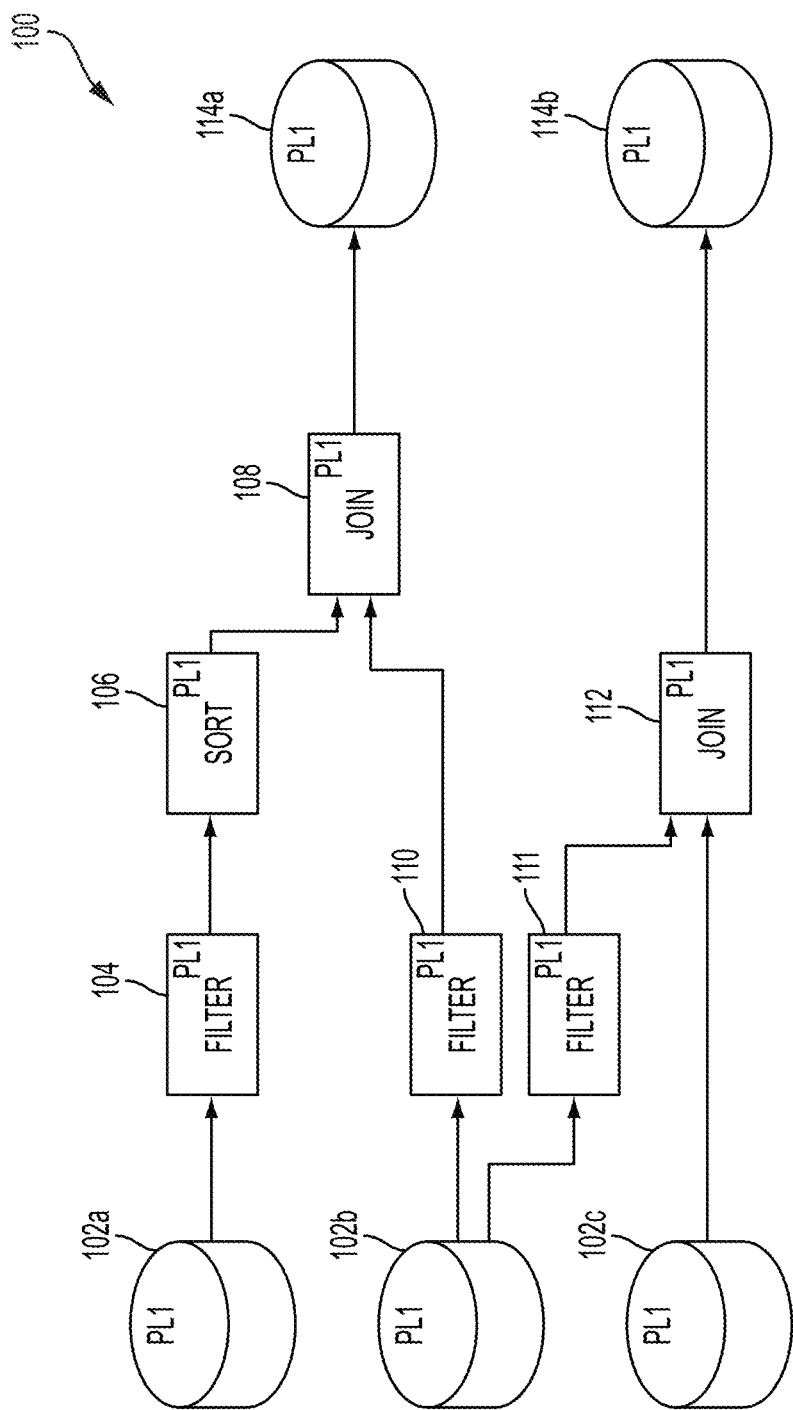
FIG. 1A is a diagram of an illustrative dataflow graph with each of the nodes being associated with the same processing layout.

Aspects of the technology described herein are related to increasing the speed and throughput of a data processing system by improving upon conventional techniques for performing data processing operations using dataflow graphs.

As discussed above, nodes of a dataflow graph may represent respective data processing operations that may be applied to data accessed from one or more input datasets. Before applying a data processing operation to data, a processing layout for performing the data processing operation needs to be determined. The processing layout may specify how many computing devices are to be used for performing the data processing operation and may identify the particular computing devices to be used. Thus, before a data processing system may process data using a dataflow graph, processing layouts for nodes in the dataflow graph need to be determined.

Some conventional techniques for automatically determining processing layouts for nodes in a dataflow graph involve assigning processing layouts to each node in the graph such that all the processing layouts have the same degree of parallelism. For example, each node in the graph may be assigned an N-way processing layout specifying that each of the data processing operations represented by the nodes of the dataflow graph are to be performed using N computing devices, where N is an integer greater than or equal to 1. Although different data processing operations may be performed by different groups of computing devices, each such group must have the same number of computing devices (i.e., N devices). As a result, conventional techniques do not allow for one node in a dataflow graph to have an N-way (N>1) processing layout and another node to have an M-way (N≠M>1) processing layout.

The inventors have recognized that a data processing system may process data more quickly and efficiently, if processing layouts having different degrees of parallelism could be assigned to different nodes in the dataflow graph. Allowing different degrees of parallelism for different data processing operations represented by a dataflow graph may significantly increase the speed and throughput of any data processing system using the dataflow graph. As one example, consider the situation where different datasets accessed by a dataflow graph are stored using different degrees of parallelism. For example, one input dataset ("A") may be a file stored in a single location, another input dataset ("B") may be stored across 4 different locations using a distributed file system (e.g., the Hadoop Distributed File System), and an output dataset ("C") may be stored in 3 different locations using a distributed database system. It may be more efficient to read data from input dataset A using a serial processing layout, read data from input dataset B using a 4-way parallel processing layout, and write data to output dataset C using a 3-way parallel processing layout than to perform all these data processing operations using processing layouts having the same degree of parallelism, as using processing layouts having degrees of parallelism matched to that of the input and output dataset increases the speed of accessing and, subsequently processing the data contained therein. Additionally, some datasets may be accessed (e.g., read from and/or written to) using only a specified degree of parallelism. Different datasets may require different degrees of parallelism. Such datasets could not be accessed using the same dataflow graph without using the techniques described herein.

Figure 1B:
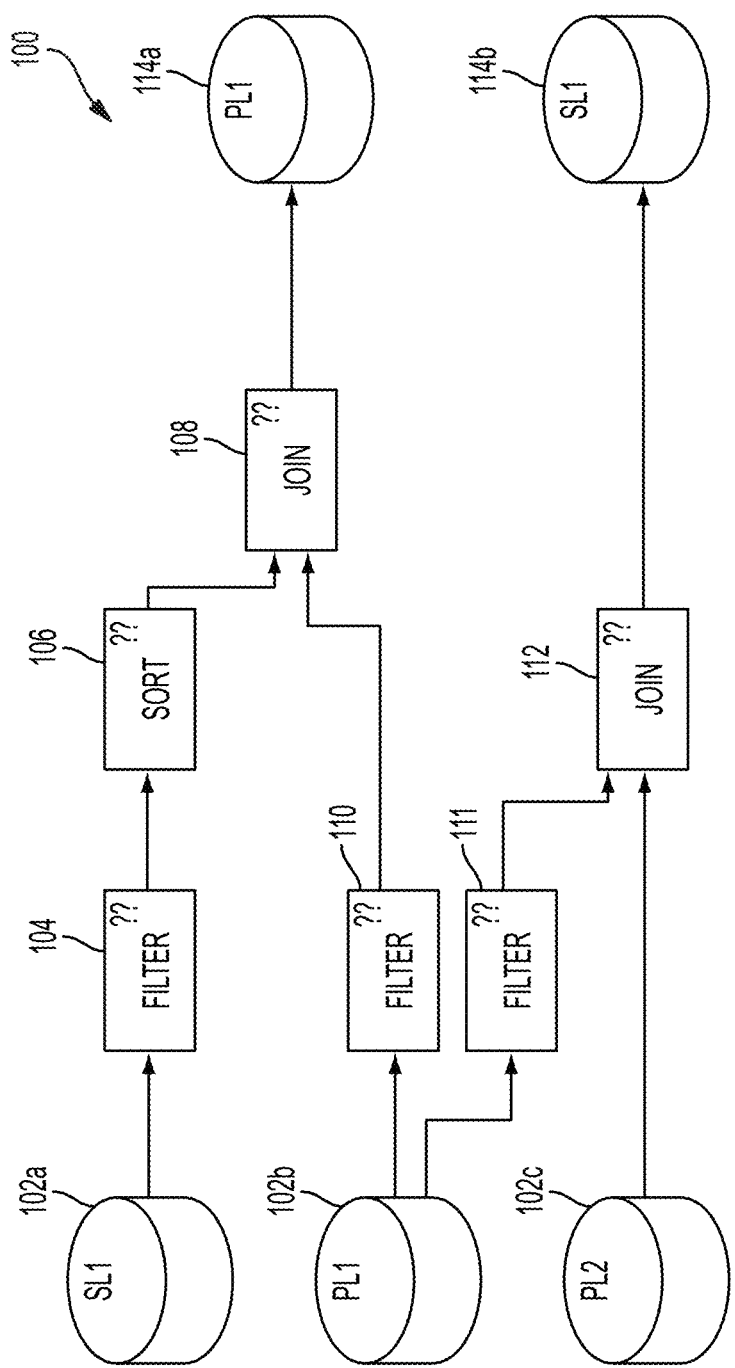
FIG. 1B is a diagram of an illustrative dataflow graph having different processing layouts for nodes in a first set of nodes and no processing layouts determined for nodes in a second set of nodes, in accordance with some embodiments of the technology described herein.

Consider, for example, the illustrative dataflow graph 100 shown in FIG. 1A, which includes input nodes 102a, 102b, 102c, nodes 104, 110, and 111 representing respective filtering operations, node 106 representing a sort operation, nodes 108 and 112 representing respective join operations, and output nodes 114a and 114b. As shown in FIG. 1A, data from the input dataset represented by node 102a is filtered, sorted and joined with a filtered version of the data from the input dataset represented by node 102b, prior to being written to the output dataset represented by output node 114a. Data from the input dataset represented by node 102b is also filtered and joined with data from the input dataset represented by node 102c prior to being written to the output dataset represented by node 114b. As shown in FIG. 1A, applying conventional techniques for automatically determining processing layouts results in the same parallel processing layout PL1 being assigned to each of the nodes of dataflow graph 100. On the other hand, if the input and output datasets were stored using different degrees of parallelism, as illustrated in FIG. 1B, assigning different processing layouts to different nodes in graph 100 may be required.

Some embodiments described herein address all of the above-described issues that the inventors have recognized with conventional techniques for performing data processing operations using dataflow graphs. However, not every embodiment described below addresses every one of these issues, and some embodiments may not address any of them. As such, it should be appreciated that embodiments of the technology described herein are not limited to addressing all or any of the above-discussed issues of conventional techniques for performing data processing operations using dataflow graphs.

Some embodiments of the technology described herein are directed to techniques for automatically determining processing layouts for performing the data processing operations represented by one or more nodes in a dataflow graph. Unlike conventional techniques for performing computations using dataflow graphs, the processing layouts determined for different nodes need not be the same—data processing operations represented by different nodes in the graph may be performed using different processing layouts and, in particular, using processing layouts having different degrees of parallelism.

As used herein, a processing layout for a node in a dataflow graph refers to a processing layout used to perform the data processing operation represented by the node. For example, a processing layout for an input node in a dataflow graph refers to a processing layout used to read data from the input dataset represented by the input node. As another example, a processing layout for an output node in a dataflow graph refers to a processing layout used to write data to the output dataset represented by the output node. As yet another example, a processing layout for a node representing a data processing operation (e.g., a filtering operation, a join operation, a rollup operation, etc.) refers to a processing layout for performing the data processing operation.

In some embodiments, a processing layout for a node representing a data processing operation may indicate a degree of parallelism to be used for performing the operation and specify the computing device(s) to be used for performing the operation in accordance with the degree of parallelism. For example, a processing layout for a node may be a serial processing layout having a single degree of parallelism (i.e., serial not parallel processing) and specify a computing device (e.g., a processor, a server, a laptop, etc.) to use for performing the data processing operation represented by the node. As another example, a processing layout for a node may be an N-way (where N≥1) greater than 1) parallel processing layout having N degrees of parallelism and specify N computing devices to use for performing the data processing operation represented by the node. In some embodiments, a processing layout for a node may specify one or more computing devices and/or one or more processes executing on the computing device(s) to use for performing the data processing operation represented by the node.

In some embodiments, determining the processing layouts for the nodes in a dataflow graph may include: (A) obtaining information specifying the dataflow graph; (B) obtaining processing layouts for input nodes in the dataflow graph; (C) obtaining processing layouts for output nodes in the dataflow graph; and (D) determining processing layouts for one or more other nodes (i.e., nodes which are not input or output nodes) based on processing layouts for input nodes, processing layouts for the output nodes, and one or more layout determination rules. Dataflow graph nodes other than the input and output nodes may be referred to as "intermediate" nodes herein. Examples of layout determination rules are described herein including with reference to FIG. 2.

In some embodiments, at least two of the processing layouts obtained for the input and output nodes of a dataflow graph may have different degrees of parallelism. For example, processing layouts obtained for two different input nodes may have different degrees of parallelism. As another example, processing layouts obtained for two different output nodes may have different degrees of parallelism. As yet another example, the processing layout obtained for an input node may have a different degree of parallelism from the processing layout obtained for an output node. Notwithstanding, the techniques described herein may be used to automatically determine processing layouts for nodes in a graph where at least two of the processing layouts obtained for the input and output nodes have different degrees of parallelism. As one illustrative example, the techniques described herein may be applied to determining processing layouts of the dataflow graph 100 shown in FIG. 1B. The input and output nodes of dataflow graph 100 are associated with three different processing layouts (i.e., serial layout SL1, parallel layout PL1, and parallel layout PL2) and these processing layouts, along with the layout determination rules described herein, may be used to automatically determine the processing layouts for the nodes 104, 106, 108, 110, 111, and 112, as shown in FIG. 1C.

In some embodiments, the processing layouts for one or more intermediate nodes in a dataflow graph may be determined by: (1) performing a forward pass (from the input node(s) towards the output node(s)) to determine an initial processing layout for at least some (e.g., all) of the intermediate nodes; and subsequently (2) performing a backward pass (from the output node(s) towards the input node(s)) to determine a final processing layout for the intermediate nodes. During the forward pass, the initial processing layouts may be determined based on the processing layouts assigned to the input nodes and one or more layout determination rules described herein. For example, the initial processing layouts for the nodes 104, 106, 108, 110, 111 and 112 may be determined based on the processing layouts assigned to the nodes 102a, 102b, and 102c. During the backward pass, the final processing layouts for the intermediate nodes may be determined based on the processing layouts assigned to the output node(s), the initial processing layouts assigned to at least some of the intermediate nodes, and one or more layout determination rules. For example, the final processing layouts for the nodes 104, 106, 108, 110, 111 and 112 may be determined based on the initial processing layouts determined for these nodes during the forward pass, the processing layouts assigned to the output nodes 114a and 114b, and one or more layout determination rules.

In some embodiments, after the processing layouts for the nodes in a dataflow graph have been determined (e.g., after performing a forward pass and a backward pass), the dataflow graph may be configured to perform a repartitioning operation on any data that is to be processed using a processing layout having a particular degree of parallelism after being processed using a processing layout having a different degree of parallelism. In some embodiments, the dataflow graph may be configured to perform a repartitioning operation on data flowing between adjacent nodes in the graph having processing layouts with different degrees of parallelism. In this way, data that has been processed using one processing layout (using N computing devices, with N≥1) may be adapted for subsequent processing using another processing layout (using M≠N computing devices, with M≥1).

Figure 1C:
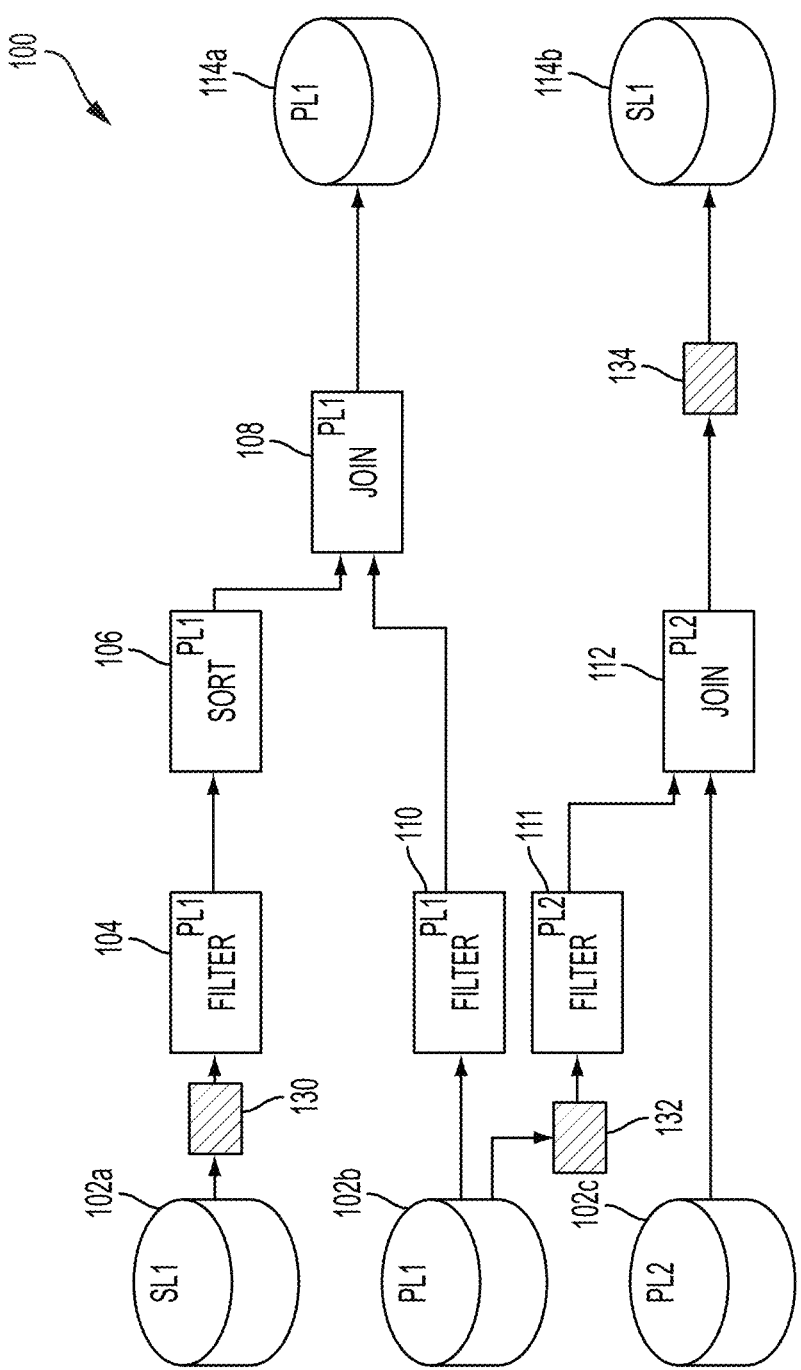
FIG. 1C is a diagram of the illustrative dataflow graph of FIG. 1B that shows the processing layouts determined for nodes in the second set of nodes and inserted nodes associated with respective repartitioning operations, in accordance with some embodiments of the technology described herein.

For example, as illustrated in FIG. 1C, adjacent nodes 102a and 104 have processing layouts with different degrees of parallelism, as one of the layouts is serial (processing is performed using one computing device) and the other is parallel (processing is performed using multiple computing devices). In this example, the dataflow graph may be configured to partition the data flowing from node 102a to node 104, so that it may be processed in accordance with the processing layout (PL1) determined for node 104, using multiple computing devices, after being processed in accordance with the processing layout (SL1) determined for node 102a, using a single computing device. To this end, the dataflow graph may be configured to perform a repartitioning operation that increases the degree of parallelism (e.g., a partition-by-key operation). Also, in the same example, adjacent nodes 102b and 111 have different processing layouts and adjacent nodes 112 and 114 have different processing layouts, and the dataflow graph 100 may be configured to perform a repartitioning operation on data flowing from node 102 to node 111 and a repartitioning operation (e.g., a gather operation) on data flowing from node 112 to node 114.

In some embodiments, a dataflow graph may be configured to perform a repartitioning operation (when the graph is executed) by augmenting the graph with a node representing the repartitioning operation. When the graph is executed, software configured to perform the repartitioning operation may be executed. For example, as shown in FIG. 1C, the dataflow graph may be augmented with nodes 130, 132, and 134, each of the nodes being associated with a respective repartitioning operation. In other embodiments, one or more existing nodes in the dataflow graph may be configured to perform a repartitioning operation and a new node is not added.

In some embodiments, when a node (node "A") in a dataflow graph is associated with a processing layout having a higher degree of parallelism than that of the following adjacent node in the graph (node "B"), the dataflow graph may be configured to perform a repartitioning operation on data after it is processed in accordance with the data processing operation represented by node "A" and before it is processed in accordance with the data processing operation represented by node "B". In this case, the repartitioning operation may decrease the degree of parallelism and, for example, may be a gather operation[1] or a merge operation.[2] For example, as shown in FIG. 1C, the parallel processing layout (PL2) of node 112 has a higher degree of parallelism than the serial processing layout (SL1) of the following adjacent node 114b. In this example, node 134 associated with a gather operation has been added between nodes 112 and 114b.

[1] A gather operation performed on multiple sets of data records may combine the multiple sets of data records into a single set of data records, but without necessarily maintaining sortedness of the data records in the single set.
[2] A merge operation performed on multiple sets of data records may combine the multiple sets of data records into a single set of data records, while maintaining sortedness of the data records in the single set.

In some embodiments, when a node (node "A") in a dataflow graph is associated with a processing layout having a lower degree of parallelism than that of the following adjacent node in the graph (node "B"), the dataflow graph may be configured to perform a repartitioning operation on data after it is processed in accordance with the data processing operation represented by node "A" and before it is processed in accordance with the data processing operation represented by node "B". In this case, the repartitioning operation may increase the degree of parallelism and, for example, may be a partition-by-key operation[3], a round-robin partition operation, a partition-by-range operation[4], or any other suitable type of partitioning operation. For example, as shown in FIG. 1C, the serial processing layout of node 102a (SL1) has a lower degree of parallelism than the parallel processing layout (PL1) of the following adjacent node 114b. Similarly, in this example, the parallel processing layout (PL1) of node 102b has a lower degree of parallelism than the parallel processing layout (PL2) of node 111. In this example, node 130 representing a partition by key operation has been added between nodes 102a and 104, and node 132 representing a round-robin partition operation followed by a gather operation which achieve a desired reduction in the degree of parallelism.

[3] In a partition-by-key operation, data records having the same value(s) for the same field(s) (e.g., in the same column(s)) are assigned to the same partition.
[4] In a partition-by-range operation, different partitions are associated with different non-overlapping ranges of values, and any data record having a field value in a range is assigned to the partition associated with the range.

In some embodiments, when a node (node "A") in a dataflow graph is associated with a processing layout having the same degree of parallelism as that of the following adjacent node in the graph (node "B"), no repartitioning operation is needed.

Although, in some embodiments, processing layouts for intermediate nodes of a dataflow graph may be determined based on the processing layouts assigned to input and output nodes of the graph, the techniques described herein are not limited to determining layouts of intermediate nodes from layouts of input and output nodes. In some embodiments, for example, processing layouts may be obtained for any subset of one or more nodes of a dataflow graph and processing layouts for any other node(s) in the dataflow graph may be determined based on these obtained processing layouts, the structure of the dataflow graph, and one or more layout determination rules.

Some embodiments of the technology described herein may be applied to managing database queries, such as Structured Query Language (SQL) queries, by a data processing system. In some embodiments, a data processing system may: (1) receive a database query (e.g., a SQL query); (2) generate a query plan for executing the SQL query (e.g., a plan indicating the database operations that may be performed if the database query were executed); (3) generate a dataflow graph from the query plan; and (4) execute the received database query at least in part by executing the dataflow graph. Such embodiments are described in further detail in U.S. Pat. No. 9,116,955, titled "MANAGING DATA QUERIES," issued on Aug. 25, 2015, which his incorporated by reference herein in its entirety. U.S. Pat. No. 9,116,955 matured from U.S. patent application Ser. No. 13/098,823, titled "MANAGING DATA QUERIES," and filed on May 2, 2011, which application is incorporated by reference herein in its entirety.

In some embodiments, techniques described herein may be used for automatically determining processing layouts for one or more nodes in a dataflow graph generated, automatically, from a database query (e.g., a SQL query).

In some embodiments, a data processing system may: (1) receive a database query (e.g., a SQL) query; (2) transform the received database query into computer code comprising computer code portions that, when executed, executes the database query; and (3) automatically determine a processing layout for executing each of the computer code portions. In some embodiments, the processing layouts for executing the computer code portions may be determined using information indicating the order of execution of the computer code portions. For example, in some embodiments, each of the computer code portions may be associated with a respective node in a dataflow graph, and the structure of the graph (e.g., as embodied in the connections among the nodes) may be used to assign processing layouts to the nodes and, by association, to the computer code portions associated with the nodes. However, it should be appreciated that in some embodiments, processing layouts for executing the computer code portions may be determined without using a dataflow graph because information indicating the order of execution of the computer code portions is not limited to being encoded in a dataflow graph.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 2:
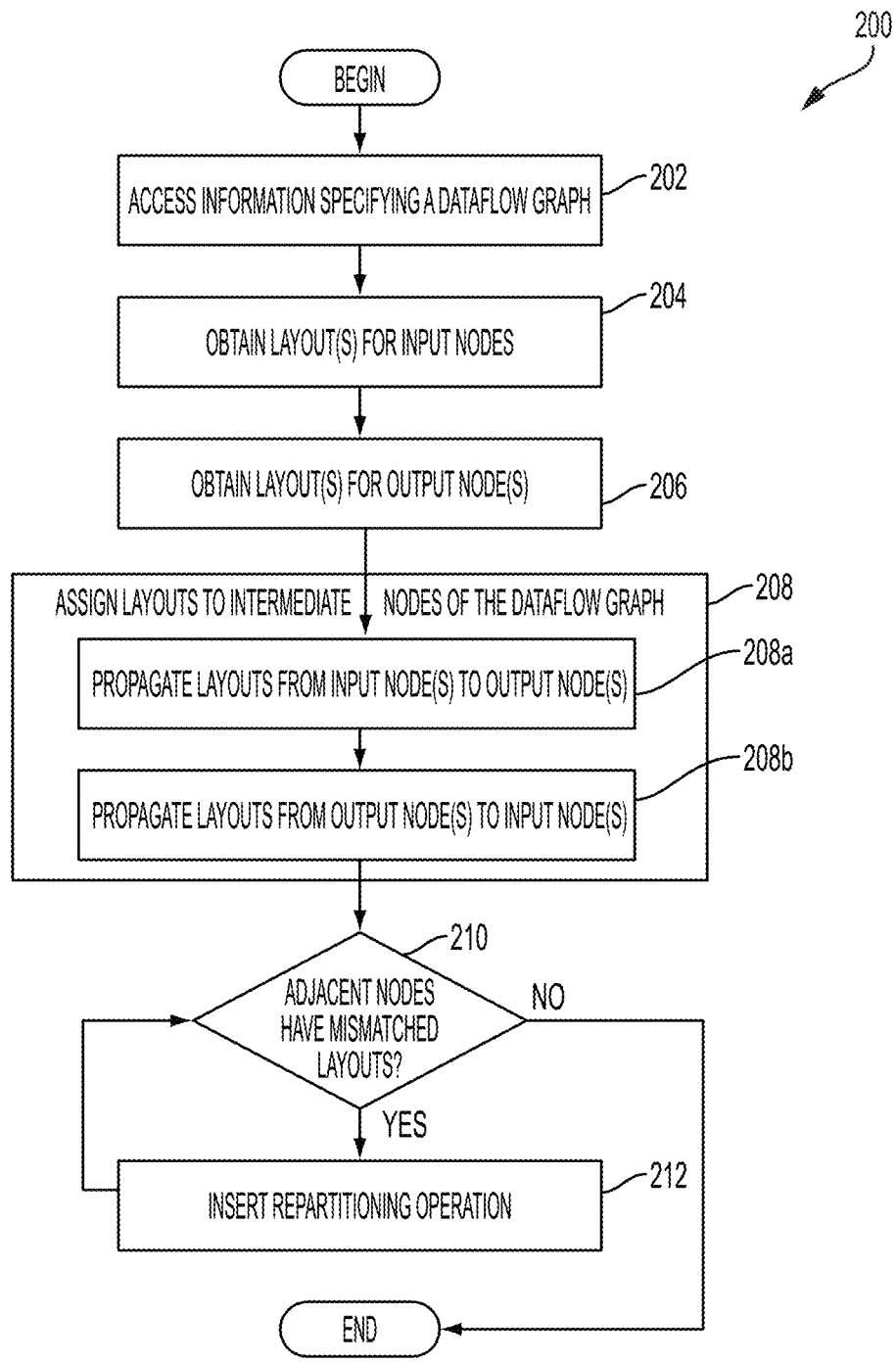
FIG. 2 is a flowchart of an illustrative process for determining a processing configuration for a dataflow graph at least in part by determining processing layouts for nodes in the dataflow graph, in accordance with some embodiments of the technology described herein.

FIG. 2 is a flowchart of an illustrative process 200 for determining a processing configuration for a dataflow graph at least in part by assigning processing layouts to nodes in the dataflow graph, in accordance with some embodiments of the technology described herein. Process 200 may be performed by any suitable system and/or computing device and, for example, may be performed by data processing system 602 described herein including with reference to FIG. 6. After process 200 is described, some aspects of process 200 are illustrated with reference to the examples shown in FIGS. 3A-3D, 4A-4C, and 5A-5D. Although the example of FIGS. 3A-3D is described in detail after the description of process 200, this example is also referenced throughout the description of process 200 for clarity of exposition.

Process 200 begins at act 202, where information specifying a dataflow graph may be accessed. As described herein, a dataflow graph may include multiple nodes including: (a) one or more input nodes representing one or more respective input datasets; (b) one or more output nodes, representing one or more respective output datasets; and/or (c) one or more nodes representing data processing operations that may be performed on the data. Directed links or edges among nodes in the dataflow graph represent flows of data between the nodes. Accordingly, at act 202, information specifying the nodes (including any of the above-described types of nodes) and links of the dataflow graph may be accessed. This information may be accessed from any suitable source, any suitable data structure(s), and may be in any suitable format, as aspects of the technology described herein are not limited in this respect. For example, with reference to the example illustrated in FIGS. 3A-D, at act 202, information specifying dataflow graph 300 may be accessed. In some embodiments, described in further detail below, the dataflow graph about which information is accessed at act 202 may have been generated automatically and, for example, may have been generated automatically from a structured query language (SQL) query.

Next, at act 204, processing layouts may be obtained for each input node (i.e., each node representing an input dataset) of the dataflow graph accessed at act 202. For example, with reference to the example of FIGS. 3A-3D, at act 204, processing layouts for input nodes 302 and 304 may be obtained. In some embodiments, a processing layout for an input node specifies a degree of parallelism (e.g., serial, 2-way parallel, 3-way parallel, . . . , N-way parallel for any suitable integer N) for reading data from the input dataset represented by the input node. In some embodiments, a processing layout for an input node identifies a set of one or more computing devices (e.g., a set of one or more processors, servers, and/or any other suitable devices) to use for reading data from the input dataset.

The processing layout for an input node may be obtained in any suitable way. In some embodiments, the processing layout for an input node may be determined prior to the start of execution of process 200 and, during act 204, the previously-determined processing layout may be accessed. In other embodiments, the processing layout for an input node may be determined dynamically during the execution of process 200. In some embodiments, the processing layout for an input may be partially determined prior to the start of execution of process 200, with the unknown information being determined dynamically during the execution of process 200. For example, prior to the execution of process 200 it may be known that processing layout for an input node is serial or parallel, but the specific computing device(s) used to perform the input operation (e.g., reading data from one or more sources) may be determined during execution of process 200. As another example, it may be known in advance of executing process 200 that a parallel processing layout is to be assigned to an input node, but the degree of parallelism may be determined during runtime.

Regardless of whether a processing layout for an input node is determined before or during execution of process 200, that determination may be made in any suitable way. For example, in some embodiments, the processing layout for an input node may be specified manually by a user through a user interface (e.g., a graphical user interface, a configuration file, etc.). As another example, in some embodiments, the processing layout for an input node may be determined automatically by the data processing system. For example, the data processing system may automatically determine a processing layout for an input node based on how the input dataset represented by the input node is stored. For example, when an input dataset is stored across multiple devices (e.g., 4 servers, using a Hadoop cluster, etc.), the data processing system executing process 200 may determine that a parallel processing layout (e.g., a four-way parallel processing layout, the number of nodes in the Hadoop cluster) is to be used for reading data records from the input dataset.

Next, at act 206, processing layouts may be obtained for each output node (i.e., each node representing an output dataset) of the dataflow graph accessed at act 202. For example, with reference to the example of FIGS. 3A-3D, at act 206, a processing layout for the output node 314 may be obtained. In some embodiments, a processing layout for an output node specifies a degree of parallelism (e.g., serial, 2-way parallel, 3-way parallel, . . . , N-way parallel for any suitable integer N) for writing data to the output dataset represented by the output node. In some embodiments, a processing layout for an output node identifies a set of one or more computing devices (e.g., a set of one or more processors, servers, and/or any other suitable devices) to use for writing data to the output dataset.

The processing layout for an output node may be obtained in any suitable way. In some embodiments, the processing layout for an output node may be determined prior to the start of execution of process 200 and, during act 206, the previously-determined processing layout may be accessed. In other embodiments, the processing layout for an output node may be determined dynamically during the execution of process 200. In some embodiments, the processing layout for an output node may be partially determined prior to the start of execution of process 200, with the unknown information being determined dynamically during the execution of process 200. For example, prior to the execution of process 200 it may be known that processing layout for an output node is serial or parallel, but the specific computing device(s) used to perform the output operation (e.g., writing data to one or more output datasets) may be determined during execution of process 200. As another example, it may be known in advance of executing process 200 that a parallel processing layout is to be assigned to an output node, but the degree of parallelism may be determined during runtime.

Regardless of whether a processing layout for an output node is determined before or during execution of process 200, that determination may be made in any suitable way including in any of the ways described above for determining a processing layout for an input node. For example, the processing layout for an output node may be specified manually by a user through a user interface or may be determined automatically by the data processing system (e.g., based on how the output dataset represented by the output node is stored).

Next, process 200 proceeds to act 208, where the processing layouts are determined for nodes in the dataflow graph other than the input and the output nodes, for which processing layouts have been obtained at acts 204 and 206. In some embodiments, a processing layout for an intermediate node specifies a degree of parallelism (e.g., serial, 2-way parallel, 3-way parallel, . . . , N-way parallel for any suitable integer N) for performing the data processing operation represented by the intermediate node. In some embodiments, a processing layout for an intermediate node identifies a set of one or more computing devices (e.g., a set of one or more processors, servers, and/or any other suitable devices) to use for performing the data processing operation.

In some embodiments, the processing layouts for intermediate nodes may be determined at least in part by using the processing layouts for the input and output nodes (obtained at acts 204 and 206). For example, with reference to the example of FIGS. 3A-3D, at act 208, processing layouts for the intermediate nodes 306, 308, 310, and 312 may be determined using the processing layouts for the input nodes 302 and 304 and the output node 314. In some embodiments, the processing layouts for intermediate nodes may be determined further based on the structure of the dataflow graph and one or more layout determination rules.

In some embodiments, the layout determination rules may specify how the processing layout for a node in the dataflow graph may be determined based on processing layouts for one or more other nodes in the dataflow graph. For example, in some embodiments, a layout determination rule may specify how the processing layout for a particular node, which is not associated with any processing layout, may be determined based on the processing layout(s) for one or more other nodes adjacent to the particular node in the graph. As one illustrative example, with reference to the example of FIG. 3A, a layout processing rule may specify how to determine the processing layout for intermediate node 306 based on the processing layout for input node 302. As another illustrative example, if processing layouts for nodes 308 and 310 were determined, a layout processing rule may specify how to determine the processing layout for node 312 based on the processing layouts determined for nodes 308 and 310.

As another example, in some embodiments, a layout determination rule may specify how to determine a processing layout for a particular node, which is already associated with a particular processing layout, based on the particular processing layout and the processing layouts of one or more other nodes adjacent to the particular node in the graph. As one illustrative example, with reference to the example of FIG. 3C, a processing layout for node 312 may be determined based on an initial processing layout determined for node 312 (layout PL1) and on the processing layout determined for output node 314 (layout SL2).

Non-limiting illustrative examples of specific layout determination rules are described below. It should be appreciated that, in some embodiments, one or more other layout determination rules may be used in addition to or instead of the example layout determination rules described herein. It should also be appreciated that any suitable combination of one or more of the example layout rules described herein may be used in some embodiments. The layout determination rules described herein may be implemented in any suitable way (e.g., using software code, one or more configuration parameters, etc.), as aspects of the technology described herein are not limited in this respect.

In some embodiments, in accordance with one example layout determination rule, when determining a processing layout for a particular node, which is not already associated with a processing layout, if the particular node has a neighbor (e.g., a node immediately preceding the particular node in the dataflow graph or a node immediately following the particular node in the dataflow graph) with an associated processing layout, the layout of the neighboring node may be determined as the processing layout of the particular node. In this way, the processing layout of a neighboring node may be "copied" to the particular node. As one illustrative example, in the example of FIG. 3A, the processing layout of node 306 may be determined to be the processing layout of its preceding neighboring node 302. In turn, the processing layout of node 308 may be determined to be the processing layout of its preceding node 306. As may be appreciated from this example, this layout determination rule may be applied repeatedly to propagate a layout of an input node (e.g., node 302) to one or more other nodes (e.g., nodes 306, 308, and 312).

In some embodiments, in accordance with another example layout determination rule, when determining a processing layout for a particular node, which is not already associated with a particular processing layout, if the particular node has multiple neighbors (e.g., multiple preceding neighbors or multiple following neighbors) with associated processing layouts, the processing layout for the particular node may be selected from among the layouts of its neighbors. For example, for the dataflow graph of FIG. 3A, assuming that the layouts of nodes 308 and 310 were determined but the layout of node 312 was not yet determined, the layout for node 312 may be selected to be one of the layouts determined for nodes 308 and 310.

In some embodiments, in accordance with another example layout determination rule, when determining a processing layout for a particular node that is already associated with a particular processing layout, if the particular node has one or more neighbors associated with respective processing layouts, the layout for the particular node may be determined by selecting from among the particular processing layout already associated with the node and the processing layouts of its neighbors. For example, as shown in FIG. 3C, node 312 is associated with an initial processing layout (PL1) and has a neighboring node 314 associated with another processing layout (SL2). In this example, one of these two layouts (i.e., PL1 and SL2) may be selected as an updated (e.g., final) processing layout for node 312.

As may be appreciated from the foregoing, in some embodiments, applying certain layout determination rules involves selecting a processing layout from among two or more processing layouts. This may be done in any of numerous ways. For example, in some embodiments, when selecting a processing layout for a node from a group of two or more processing layouts, the processing layout having the greatest degree of parallelism may be selected. For example, when selecting a processing layout for a node to be either an N-way parallel processing layout (e.g., a 10-way parallel layout) or an M-way (with M<N) parallel processing layout (e.g., a 5-way parallel layout), the N-way parallel processing layout may be selected. As another example, when selecting a processing layout for a node from a parallel processing layout and a serial processing layout, the parallel processing layout may be selected. As one illustrative example, with reference to FIG. 3B, node 312 may be assigned an initial serial processing layout (SL1) (e.g., as a result of propagating that layout from input node 302) and the node 310 may be assigned a parallel layout PL1 (e.g., as a result of propagating that layout from input node 304). Then, the processing layout for node 312 may be updated to be the parallel layout PL1 because, as between PL1 and SL1, the layout PL1 clearly has a greater degree of parallelism.

As another example, in some embodiments, when selecting a processing layout for a node from among processing layouts having the same degree of parallelism, the processing layout being used to process the larger number of records may be selected. For example, when selecting a processing layout for a node in a dataflow graph from a 4-way layout PL1 assigned to a first preceding neighbor of the node and being used to process 10 million data records and a 4-way layout PL2 assigned to a second preceding neighbor of the node and being used to process 10 thousand data records, the layout PL1 may be selected for the node. In this way, the data processing operation associated with the node (e.g., a join operation) may be performed using the same processing layout (e.g., the same computing devices) as the one used to process 10 million data records. As a result, when the layouts PL1 and PL2 are implemented using non-overlapping sets of computing devices, at most 10 thousand data records would need to be moved to the computing devices used to process the 10 million data records. On the other hand, if the layout PL2 were selected, then possibly all 10 million data records would need to be moved to the computing devices used to process only 10 thousand data records, which is clearly inefficient. Thus, selecting a layout that is used to process a greater number of records may serve to improve the performance of the data processing system. An example of this is described further below with reference to FIGS. 4A-4C.

In some embodiments, in accordance with another example layout determination rule, after processing layouts are determined for input nodes and output nodes of a dataflow graph, these processing layouts are not subsequently changed. In embodiments where this rule is utilized, after the processing layouts for the input and output nodes are obtained at acts 204 and 206, these processing layouts are not subsequently changed.

In some embodiments, in accordance with another example layout determination rule, a serial processing layout may be assigned to a node representing the limit operation, which is an operation that when applied to a group of data records outputs a fixed number of the data records (e.g., output the data records having the top ten scores after the data records have been sorted based on their respective scores).

In some embodiments, one or more internal nodes in a dataflow graph may be associated with a predetermined processing layout. In some embodiments, nodes of a particular type may be associated with a predetermined processing layout.

In some embodiments, in accordance with another example layout determination rule, when a processing layout is assigned to a particular node in a dataflow graph, an indication may be supplied (e.g., by a user through a user interface such as a graphical user interface or a configuration file) to not propagate the processing layout assigned to the particular node to any other nodes. For example, in some embodiments, an indication to not propagate a processing layout assigned to one or more input nodes and/or one or more output nodes may be provided as part of obtaining the input and/or output processing layouts at acts 204 and/or 206.

An example of this is described further below with reference to FIGS. 5A-5D.

Any of the above-described layout determination rules may be used to determine processing layouts for intermediate nodes at act 208 of process 200. Although some of the above-described layout determination rules are "local" in that they specify how to determine a processing layout for a particular node based on layouts already assigned to its neighbors, in some embodiments, one or more of these layout determination rules may be applied repeatedly so as to propagate the processing layouts obtained for input and output processing nodes to intermediate nodes. This propagation may be done in any suitable way.

In some embodiments, processing layouts for intermediate nodes may be determined at act 208 by: (1) performing a forward pass at act 208a to determine an initial processing layout for at least some (e.g., all) of the intermediate nodes; and (2) performing a backward pass at act 208b to determine a final processing layout for at least some (e.g., all) of the intermediate nodes.

During the forward pass, processing layouts obtained for the input node(s) may be propagated to the intermediate nodes in the dataflow graph using one or more of the layout determination rules described herein. The structure of the dataflow graph may guide the order in which processing layouts are determined for nodes during the forward pass. For example, processing layouts for neighbors of the input nodes may be determined first, then processing layouts for the neighbors of the neighbors of the input nodes may be determined, and so on . . . until all the flows from the input nodes have been followed through to their ends at the output nodes. As one illustrative example, with reference to FIG. 3B, the processing layouts for input nodes 302 and 304 may be propagated during the forward pass using one or more layout determination rules to obtain initial processing layouts for nodes 306, 308, 310, and 312.

During the backward pass, processing layouts obtained for the output node(s) may be propagated to the intermediate nodes in the dataflow graph using one or more of the layout determination rules described herein. As in the case of the forward pass, the structure of the dataflow graph may guide the order in which processing layouts are determined for nodes during the backward pass. For example, processing layouts for neighbors of the output nodes may be determined first, then processing layouts for the neighbors of the neighbors of the output nodes may be determined, and so on . . . until all the edges from the output nodes have been followed through to their ends at the output nodes. The paths followed are the reverse during the backward pass may be reverse of the paths followed in the forward pass. As one illustrative example, with reference to FIG. 3C, the processing layout for output node 314 and the initial processing layouts for nodes 306, 308, 310, and 312 may be used during the backward pass together with one or more layout determination rules to obtain the final processing layouts for nodes 306, 308, 310, and 312. This is discussed in more detail below with reference to FIGS. 3A-3D.

After processing layouts have been determined for the intermediate nodes at act 208, process 200 proceeds to decision block 210, where it is determined whether any adjacent nodes in the dataflow graph have mismatched layouts. Adjacent nodes "A" and "B" have mismatched layouts when the processing layout determined for node A has a different degree of parallelism from the processing layout determined for node B. For example, when an N-way (N>1) parallel processing layout is determined for node A and a serial processing layout is determined for a following node B, the nodes have mismatched layouts (there is an N-to-1 transition). As another example, when a serial processing layout is determined for node A and an M-way (M>1) parallel processing layout is determined for a following node B, the nodes have mismatched layouts (there is a 1-to-M transition). As another example, when an N-way parallel processing layout is determined for node A and an M-way parallel processing layout is determined for adjacent node B, with M≠N, the nodes have mismatched layouts (there is an N-to-M transition).

When it is determined, at decision block 210, that there is a pair of adjacent nodes having processing layouts with different degrees of parallelism, process 200 proceeds to act 212, where the dataflow graph may be configured to perform one or more repartitioning operations. The repartitioning operation(s) allow for data records being processed using one processing layout using one number of processors to be transitioned for processing using another processing layout using a different number of processors. Examples of repartitioning operations are described herein and include, for example, repartitioning operations for increasing the degree of parallelism in the processing of data (e.g., a partition-by-key operation, a round robin partition operation, a partition by range operation, and/or any other suitable type of partition operation) and repartitioning operations for decreasing the degree of parallelism in the processing of data (e.g., a merge operation and a gather operation). For example, when there is an N-to-1 transition between adjacent nodes A and B, the dataflow graph may be configured to perform a repartitioning operation for decreasing the degree of parallelism (from N to 1) of data processed in accordance with the operation represented by node A and before that data is processed in accordance with the operation represented by node B. As another example, when there is a 1-to-M transition between adjacent nodes A and B, the dataflow graph may be configured to perform a repartitioning operation for increasing the degree of parallelism (from 1 to M) of data processed in accordance with the operation represented by node A and before that data is processed in accordance with the operation represented by node B. As yet another example, when there is an N-to-M transition between adjacent nodes A and B, the dataflow graph may be configured to perform multiple repartitioning operations in order to change the degree of parallelism (from N to M) on data processed in accordance with the operation represented by node A and before that data is processed by the operation represented by node B. The multiple repartitioning operations may include a first repartitioning operation to decrease the degree of parallelism (e.g., from N to K) and a second repartitioning operation to increase the degree of parallelism (e.g., from K to M, where K is a common divisor of N and M).

In some embodiments, a dataflow graph may be configured to perform a repartitioning operation by adding a new node representing the repartitioning operation. Examples of this are shown in FIGS. 3D, 4C, and 5D, which are described below. In such embodiments, a processing layout may be determined for the node representing the repartitioning operation. When the repartitioning operation increases the degree of parallelism (e.g., a partition-by-key operation), the processing layout assigned to the node representing the repartitioning operation may be the processing layout assigned to the preceding node. When the repartitioning operation decreases the degree of parallelism (e.g., a merge operation or a gather operation), the processing layout assigned to the node representing the repartitioning operation may be the processing layout assigned to the following node in the graph. In other embodiments, existing nodes in a dataflow graph may be configured to perform a repartitioning operation.

In some embodiments, the data processing system performing process 200 may be programmed to configure the dataflow graph to perform certain types of repartitioning operations in certain situations. For example, in some embodiments, when a dataflow graph is configured to perform a repartitioning operation to decrease the degree of parallelism and the data is sorted, if the sortedness of the data is to be maintained through the repartitioning, then the dataflow graph may be configured to perform a merge operation to decrease the degree of parallelism. Otherwise, a gather operation may be used to decrease the degree of parallelism. As another example, in some embodiments, when a dataflow graph is configured to perform a repartitioning operation to increase the degree of parallelism, when a certain partitioning of the data is desired, the dataflow graph may be configured to perform a partition-by-key operation for a particular key or keys. Otherwise, a round-robin partition operation or another type of partition operation may be used. As another example, in some embodiments, applying a rollup operation to parallel data may require repartitioning, if the data is not already partitioned on a subset of the rollup keys. In this case, when the rollup is estimated to reduce the amount of data significantly (e.g., at least by a factor of 10), then a double-bubble rollup may be performed (i.e., first a rollup in the source layout and partitioning scheme, then a repartition, then a second rollup in the destination layout and partitioning scheme).

On the other hand, when it is determined, at decision block 210, that there are no adjacent nodes having processing layouts with different degrees of parallelism or that, for any adjacent nodes having layouts with different degrees of parallelism, appropriate repartitioning logic has been added to the dataflow graph, process 200 completes.

In some embodiments, after the processing layouts have been assigned using process 200, the dataflow graph may be executed in accordance with the assigned layout. In this way, each of one or more data processing operations in the dataflow graph is executed in accordance with the processing layout assigned to that data processing operation.

In some embodiments, process 200 may be applied to automatically generated dataflow graphs. For example, in some embodiments, process 200 may be applied to dataflow graphs automatically generated from a SQL query, from information specifying a query provided by another database system, and/or from another dataflow graph.

In some embodiments, a dataflow graph may be generated from a SQL query by: (1) receiving a SQL query; (2) generating a query plan from the received SQL query; and (3) generating the dataflow graph from the query plan. In turn, process 200 may be applied to the dataflow graph so generated. Each of these three acts (of automatically generating a dataflow graph to which process 200 may be applied) is described in more detail below.

In some embodiments, the SQL query may be received by a data processing system (e.g., the data processing system executing process 200 such as, for example, data processing system 602) as a result of a user providing the SQL query as input to the data processing system. The user may input the SQL query through a graphical user interface or any other suitable type of interface. In other embodiments, the SQL query may be provided to the data processing system by another computer program. For example, the SQL query may be provided by a computer program configured to cause the data processing system to execute one or more SQL queries, each of which may have been specified by a user or automatically generated. The SQL query may be of any suitable type and may be provided in any suitable format, as aspects of the technology described herein are not limited in this respect.

In some embodiments, the received SQL query may be used to generate a query plan. The generated query plan may identify one or more data processing operations to be performed if the SQL query were executed. The generated query plan may further specify an order in which the identified data processing operations are to be executed. As such, the generated query plan may represent a sequence of data processing operations to perform in order to execute the received SQL query. The generated query plan may be generated using any suitable type of query plan generator. Some illustrative techniques for generating query plans are described in U.S. Pat. No. 9,116,955, titled "Managing Data Queries," which is incorporated by reference herein in its entirety.

In turn, in some embodiments a dataflow graph may be generated from the query plan, which itself was generated using the received SQL query. In some embodiments, the dataflow graph may be generated from a query plan at least in part by generating the dataflow graph to include a node for each of at least a subset (e.g., some or all) of the data processing operations identified in the query plan. In some embodiments, a single node in a query plan may result in the inclusion of multiple nodes in the dataflow graph. Subsequently, the order of data processing operations specified in the query plan may be used to generate links connecting nodes in the dataflow graph. For example, when the generated query plan indicates that a first data processing operation is performed before a second data processing operation, the generated dataflow graph may have a first node (representing the first data processing operation) and a second node (representing the second data processing operation) and one or more links specifying a path from the first node to the second node.

In some embodiments, generating the dataflow graph from the query plan comprises adding one or more nodes to the graph representing input and/or output data sources. For example, generating the dataflow graph may comprise adding an input node for each of the data sources from which data records are to be read during execution of the SQL query. Each of the input nodes may be configured with parameter values associated with the respective data source. These values may indicate how to access the data records in the data source. As another example, generating the dataflow graph may comprise adding an output node for each of the data sinks to which data records are to be written during execution of the SQL query. Each of the output nodes may be configured with parameter values associated with the respective data sinks. These values may indicate how to write the data records to the data source.

It should be appreciated that the dataflow graph generated from a query plan is different from the query plan itself. A dataflow graph can be executed by a using graph execution environment (e.g., co-operating system 610 or any other suitable execution environment for executing dataflow graphs), whereas a query plan cannot be executed by the graph execution engine—it is an intermediate representation that is used to generate the dataflow graph, which dataflow graph is executed by the graph execution engine in order to execute the SQL query. A query plan is not executable and, even in the context of a relational database management system, it needs to be further processed to generate an execution strategy. By contrast, a dataflow graph is executable by the graph execution engine in order to perform the SQL query. In addition, even after further processing by a relational database system, the resulting execution strategy does not allow for reading data from and/or writing data to other types of data sources and/or data sinks, whereas dataflow graphs are not limited in this respect.

In some embodiments, the dataflow graph generated from a query plan may contain a node representing a data processing operation, which is not in the query plan. Conversely, in some embodiments, the dataflow graph generated from a query plan may not contain a node representing a data processing operation, which is in the query plan. Such situations may arise due to various optimizations which may be performed during the process of generating a dataflow graph from a query plan. In some embodiments, the dataflow graph may contain a node representing a data processing operation other than a database operation being performed on a database computer system (e.g., a relational database management system).

In some embodiments, the query plan and the dataflow graph may be embodied in different types of data structures. For example, in some embodiments, the query plan may be embodied in a directed graph in which each node has a single parent node (e.g., a tree, such as, for example, a binary tree), whereas the dataflow graph may be embodied in a directed acyclic graph, which may have at least one node that has multiple parent nodes.

It should be appreciated that process 200 is illustrative and that there are variations. For example, although in the illustrated embodiment of FIG. 2, processing layouts for intermediate nodes are determined using a forward pass followed by a backward pass, in other embodiments, processing layouts may be determined instead by using backward pass followed by a forward pass. As another example, although in the illustrated embodiments, processing layouts for intermediate nodes were determined based on the layouts assigned to input and output nodes, the processing layout determination techniques described herein may be applied more generally. For example, processing layouts may be obtained for a set of one or more nodes in the dataflow graph and processing layouts may be obtained for other nodes in the dataflow graph based on: (1) processing layouts for obtained for the set of nodes; (2) the link structure of the dataflow graph; and (3) one or more layout determination rules. Although, the set of nodes may include the input and output nodes, it need not. Thus, the set of nodes may include any suitable number (e.g., zero, at least one, all) of input nodes, any suitable number (e.g., zero, at least one, all) of output nodes, and any suitable number of (e.g., zero, at least one, all) other nodes. The only requirement is that the set of nodes not be empty.

In some embodiments, a data processing system may: (1) receive a database query (e.g., a SQL) query; (2) transform the received database query into computer code comprising computer code portions that, when executed by the data processing system, execute the received database query; and (3) automatically determine a processing layout for executing each of the computer code portions. In some embodiments, the processing layouts for executing the computer code portions may be determined using information indicating the order of execution of the computer code portions. For example, in some embodiments, each of the computer code portions may be associated with a respective node in a dataflow graph, and the structure of the graph (e.g., as embodied in the connections among the nodes) along with the layout determination rules described herein may be used to assign processing layouts to the nodes and, by association, to the computer code portions associated with the nodes. However, it should be appreciated that in some embodiments, processing layouts for executing the computer code portions may be determined without using a dataflow graph because information indicating the order of execution of the computer code portions is not limited to being encoded in a dataflow graph and may be encoded in any other suitable way (e.g., another type of data structure or data structures), as aspects of the technology described herein are not limited in this respect.

Accordingly, in some embodiments, a data processing system may obtain (e.g., receive from a remote source and/or over a network connection, access from a local storage, etc.) computer code that, when executed by the data processing system, causes the data processing to execute a database query, wherein the computer code comprises: (A) a first set of one or more computer code portions each representing a data processing operation for reading in a respective input dataset; (B) a second set of one or more computer code portions each representing a data processing operation for writing out a respective output dataset; and (C) a third set of one or more computer code portions each representing a respective data processing operation. Next, data processing system may determine a processing layout for executing each of the computer code portions part of the computer code. For example, in some embodiments, the data processing system may: (A) obtain (e.g., receive, access, etc.) a first set of one or more processing layouts for one or more code portions in the first set of code portions; (B) obtain a second set of one or more processing layouts for one or more code portions in the second set of code portions; and (C) determine a processing layout for each code portion in the third set of code portions based on the first set of processing layouts, the second set of processing layouts, and one or more layout determination rules described herein including at least one rule for selecting among processing layouts having different degrees of parallelism.

In some embodiments, the computer code may be generated from the database query. For example, in some embodiments, a received database query (e.g., SQL query) may be converted to a query plan and the query plan may be processed to generate the computer code. For example, the query plan may be converted to a dataflow graph comprising a plurality of nodes and edges (as described above) and the computer code may include computer code portions, with each code portion comprising code for performing a data processing operation represented by a node in the dataflow graph. In this way, in some embodiments, computer code portions may be associated with respective nodes in a dataflow graph.

In some embodiments in which the computer code is associated with a dataflow graph, the nodes of the dataflow graph may include: (A) a first set of one or more nodes, each node in the first set of nodes representing a respective input dataset, wherein each computer code portion in the first set of computer code portions (described above) is associated with a respective node in the first set of nodes; (B) a second set of one or more nodes, each node in the second set of nodes representing a respective output dataset, wherein each computer code portion in the second set of computer code portions (described above) is associated with a respective node in the second set of nodes; and a third set of one or more nodes, each node in the third set of nodes representing a respective data processing operation. The data processing system may use: (1) processing layouts with the nodes in the first and second set; (2) one or more of the layout determination rules described herein; (3) and the structure of the graph (indicating an ordering among the data processing operations) to assign one or more processing layouts to node(s) in the third set of nodes. These processing layouts, in turn, may be used by the data processing system to execute the computer code portions associated with nodes in the third set of nodes.

FIGS. 3A-3D illustrate determining processing layouts for nodes in an illustrative dataflow graph 300 using one or more layout determination rules, in accordance with some embodiments of the technology described herein including the embodiments described with reference to FIG. 2. Among other things, the example of FIGS. 3A-3D illustrates that, in some embodiments, when determining a processing layout for a node by selecting the layout from two different processing layouts having different degrees of parallelism, the processing layout having the greater degree of parallelism may be selected as the processing layout for the node.

FIG. 3A illustrates a dataflow graph 300 having: nodes 302 and 304 representing respective input datasets; nodes 306, 308, 310, and 312 representing respective data processing operations; and node 314 representing an output dataset. As may be appreciated from the structure of dataflow graph 300, the input dataset represented by node 302 is filtered, sorted and then joined with a filtered version of the input dataset represented by node 304 prior to being written to the output dataset represented by node 314. In this example, after processing layouts for the input and output datasets are obtained, it may be determined that: serial processing layout SL1 is to be used for reading data from the dataset represented by node 302, parallel layout PL1 is to be used for reading data from the dataset represented by node 304, and serial processing layout SL2 is to be used for writing to the dataset represented by node 314, as shown in FIG. 3A. Note that although each of serial processing layouts SL1 and SL2 indicates that the data is to be processed serially (i.e., with one degree of parallelism), these serial layouts need not be the same because the serial processing may be performed by different processors (e.g., by a processor of a database storing the input dataset represented by node 302 and by a processor of another database storing the output dataset represented by node 314). At this stage, the processing layouts for the data processing operations represented by the nodes 306, 308, 310, and 312 have not yet been determined.

FIGS. 3B and 3C illustrate determining the processing layouts for the data processing operations represented by the nodes 306, 308, 310, and 312 based on the processing layouts obtained for nodes 302, 304, and 314. First, as shown in FIG. 3B, initial processing layouts are determined for nodes 306, 308, 310, and 312 in a forward pass starting from nodes 302 and 304, in accordance with the structure of the dataflow graph 300 and the layout determination rules described herein. For example, the processing layout for node 306 is determined based on the layout of the preceding node in the dataflow graph—node 302. Then, the processing layout for node 308 is determined based on the layout of the node that precedes it in the dataflow graph—node 306. After the processing layout for node 310 is determined based on the layout of its preceding node (i.e., node 304) and the processing layout for node 308 has been determined, the processing layout for node 312 is determined based on the layouts of the nodes 308 and 310, each which precedes and is connected to node 312 in dataflow graph 300.

In this example, during the forward pass, it is determined that the serial layout SL1 of node 302 is to be used for performing the data processing operation represented by node 306 because there is no node other than node 302 immediately preceding node 306 and there is no layout already associated with node 306. Then, it is determined that the layout SL1 of node 306 is to be used for performing the data processing operation represented by node 308 because there is no node other than node 306 preceding node 308 and there is no layout already associated with node 308. Similarly, it is determined that parallel layout PL1 of node 304 is to be used for performing the data processing operation represented by node 310 because there is no node other than node 304 preceding node 310 and there is no layout already associated with node 310. In this way, the layouts SL1 and PL1 are propagated through graph 300 from the input nodes 302 and 304 to any nodes for which a layout has not yet been determined and which are connected to a single preceding node (i.e., nodes 306, 308, and 310, in this illustrative example).

During the forward pass, the processing layout for the node 312, representing the join operation, is selected from the serial layout SL1 for the preceding node 308 and the parallel layout PL1 for the preceding node 310. As shown in FIG. 3B, the parallel layout PL1 is selected for node 312 during the forward pass using the layout determination rule indicating that, when selecting between two potential different processing layouts having different degrees of parallelism, the processing layout having the greater degree of parallelism is to be selected. Since the parallel processing layout PL1 has a greater degree of parallelism than the processing layout SL1, the parallel processing layout PL1 is selected for node 312 during the forward pass.

Next, as shown in FIG. 3C, final processing layouts are determined for nodes 306, 308, 310, and 312 in a backward pass starting from node 314, in accordance with the structure of the dataflow graph 300, the initial processing layouts shown in FIG. 3B, and the layout determination rules described herein. For example, the final processing layout for node 312 is determined based on the initial processing layout determined for node 312 and the layout of node 314. The final processing layout for node 308 is determined based on the initial processing layout determined for node 308 and the final processing layout determined for node 312. The final processing layout for node 306 is determined based on the initial processing layout determined for node 306 and the final processing layout determined for node 308. The final processing layout for node 310 is determined based on the initial processing layout determined for node 310 and the final processing layout determined for node 312.

In this example, during the backward pass, the final processing layout for node 312 is selected from the initial processing layout PL1 determined for node 312 during the forward pass and the serial processing layout SL2 associated with node 314. As shown in FIG. 3C, the layout PL1 is determined to be the final processing layout for node 312 since layout PL1 has a greater degree of parallelism than layout SL2. The final processing layout for node 308 is selected from the initial layout SL1 determined for node 308 during the forward pass and the final processing layout PL1 determined for node 312 during the backward pass. As shown in FIG. 3C, the layout PL1 is determined to be the final processing layout for node 308 since layout PL1 has a greater degree of parallelism than layout SL1. The final processing layout for node 306 is selected from the initial layout SL1 determined for node 306 during the forward pass and the final processing layout PL1 determined for node 308 during the backward pass. As shown in FIG. 3C, the layout PL1 is determined to be the final processing layout for node 304 since layout PL1 has a greater degree of parallelism than layout SL1. The final processing layout for node 310 is determined to be PL1 since the initial the layout determined for node 310 during the forward pass is PL1 and the final layout determined for node 312 during the backward pass is also PL1.

After the processing layouts have been determined for each of the nodes of dataflow graph 300, as shown in FIG. 3C, the dataflow graph 300 may be configured to perform one or more repartitioning operations. As described herein, the dataflow graph may be configured to perform a repartitioning operation on data records when adjacent nodes in the dataflow graph are configured to perform data processing operations on the data records using processing layouts having different degrees of parallelism. For example, as shown in FIG. 3C, the processing layouts for adjacent nodes 302 (SL1) and 306 (PL1) have different degrees of parallelism. The processing layouts for adjacent nodes 312 (PL1) and 314 (SL2) also have different degrees of parallelism.

In some embodiments, a dataflow graph may be configured to perform a repartitioning operation by adding a new node to the graph representing the repartitioning operation. For example, as illustrated in FIG. 3D, new node 342 representing a partition operation (e.g., a partition-by-key operation) may be added to the dataflow graph between nodes 302 and 306. When data records are processed in accordance with the dataflow graph having node 342, the data records are partitioned in accordance with the partitioning operation represented by node 342 after being read using the processing layout SL1 of node 302, but before being filtered using the processing layout PL1 of node 306. The partitioning operation may be performed in accordance with the layout SL1 of node 308. In addition, as illustrated in FIG. 3D, new node 344 representing a merge operation may be added to the dataflow graph between nodes 312 and 314. When data records are processed in accordance with the dataflow graph having node 344, the data records are merged after being processed using the processing layout PL1 of node 312, but before being output using the processing layout SL2 of node 314. The merging operation may be performed in accordance with the layout SL2 of node 314.

In the illustrative example of FIG. 3D, two new nodes are added to dataflow graph 300 to obtain dataflow graph 340. It should be appreciated, however, that in some embodiments a dataflow graph may be configured to perform one or repartitioning operations without adding new nodes to the graph. In some embodiments, each of one or more existing nodes may be configured to perform a respective repartitioning operation. For example, rather than adding new node 342 as shown in the illustrative embodiment of FIG. 3D, either node 302 or node 306 may be configured to perform a partitioning operation. As another example, rather than adding new node 344, as shown in the illustrative embodiment of FIG. 3D, either node 312 or node 314 may be configured to perform a merging operation.

Figure 4A:
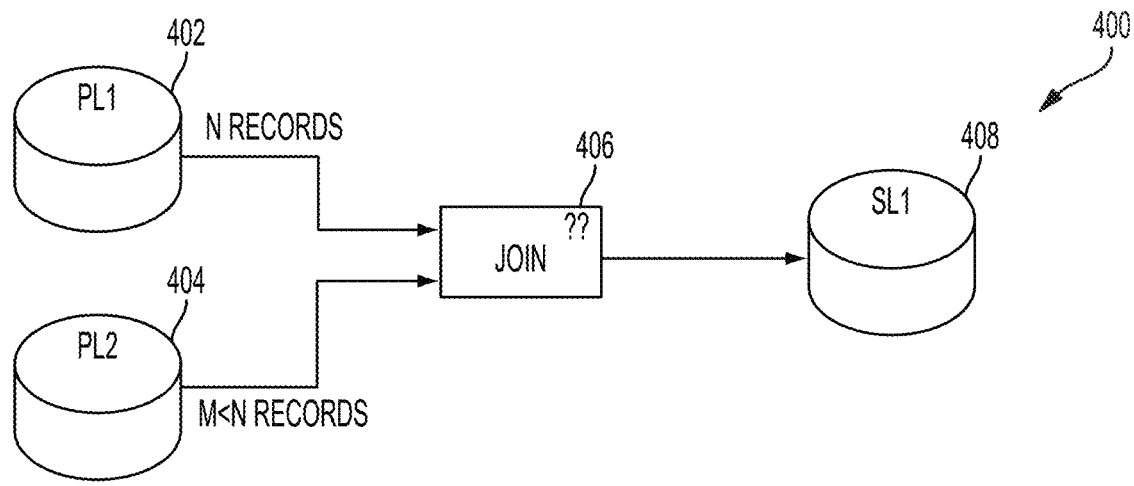
FIGS. 4A-4C illustrate determining processing layouts for nodes of another illustrative dataflow graph using one or more layout determination rules, in accordance with some embodiments of the technology described herein.
Figure 4B:
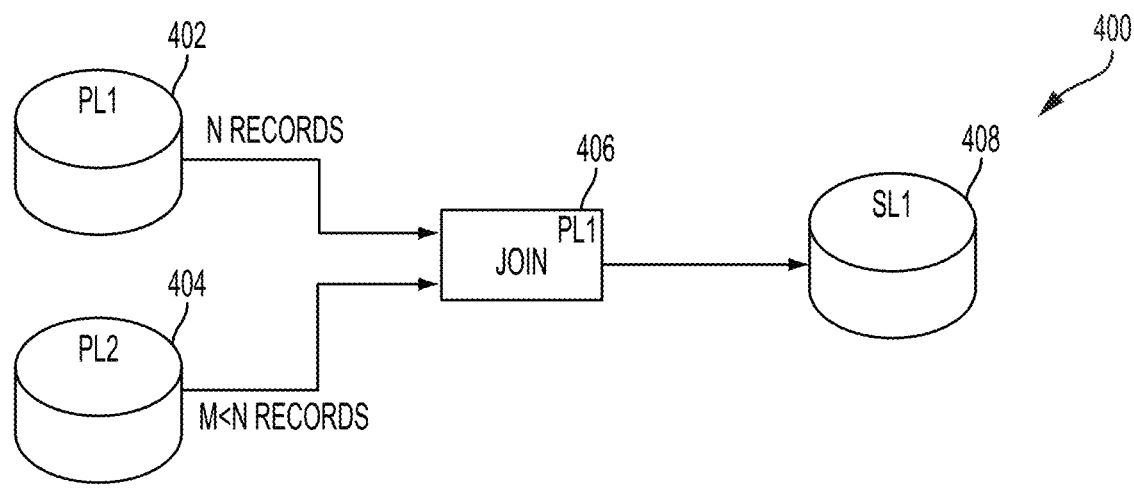
Figure 4C:
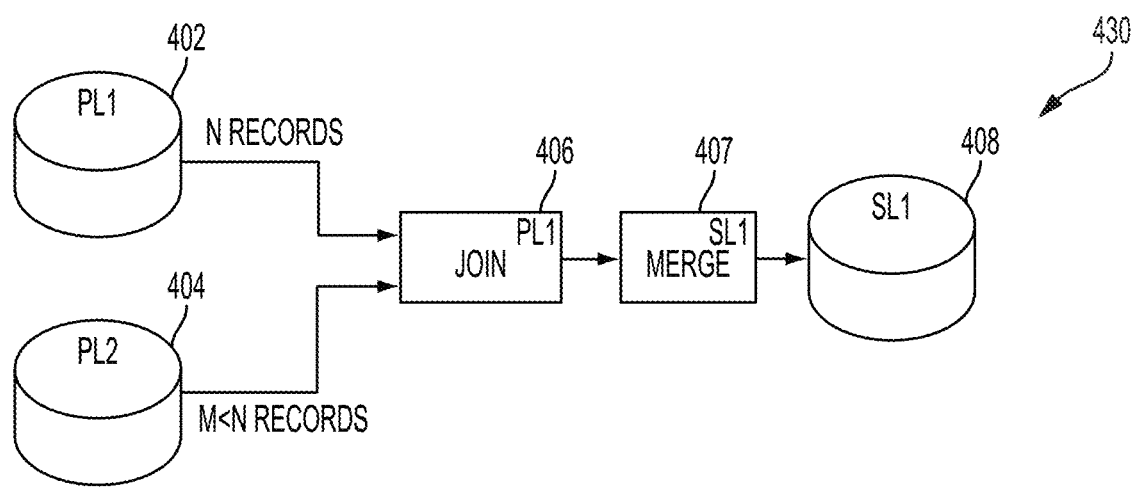

FIGS. 4A-4C illustrate determining processing layouts for nodes in an illustrative dataflow graph 400 using one or more layout determination rules, in accordance with some embodiments of the technology described herein including the embodiments described with reference to FIG. 2. Among other things, the example of FIGS. 4A-4C illustrates that, in some embodiments, when determining a processing layout for a node by selecting the layout from two processing layouts having the same degrees of parallelism, the processing layout being applied to a larger number of records may be selected as the processing layout for the node.

FIG. 4A illustrates a dataflow graph 400 having: nodes 402 and 404 representing respective input datasets; node 406 representing a data processing operation, and node 408 representing an output dataset. As may be appreciated from the structure of dataflow graph 400, the input dataset having N data records and being represented by node 402 is joined with the input dataset having M records (with M being less than N) and being represented by node 404. After the datasets are joined, they are written to output dataset represented by node 408. In this example, after processing layouts for the input and output datasets are obtained, it may be determined that: parallel processing layout PL1 is to be used for reading data from the dataset represented by node 402, parallel processing layout PL2 is to be used for reading data from the dataset represented by node 404, and serial layout SL1 is to be used for writing data records to the output dataset represented by node 408. The processing layouts PL1 and PL2 each have the same degree of parallelism. At this stage, the processing layout for the join operation represented by node 406 has not yet been determined.

During the forward pass, the initial processing layout is determined for node 406 based on the processing layouts for the nodes 402 and 404, which precede node 406 in the dataflow graph 400. In the illustrated example, the initial processing layout for node 406 is selected from among the processing layout PL1 associated with node 402 and the processing layout PL2 associated with node 404. Even though each of the layouts PL1 and PL2 has the same degree of parallelism, the layout PL1 is selected as the initial processing layout for the node 406 because PL1 is being applied for processing a greater number of records N (e.g., reading N data records from the input dataset represented by node 402) than layout PL2, which is being applied to processing M<N data records (e.g., reading M data records from the input dataset represented by node 404). This selection may be made for purposes of efficiency because fewer data records may need to moved (e.g., M<N records) when processing the join operation represented by node 406 according to layout PL1 than the number of records that would have to be moved (e.g., N records) if the join operation were processed according to layout PL2.

Next, during the backwards pass, the final processing layout for node 406 is determined based on the initial processing layout (PL1) determined for node 406 and the processing layout (SL1) associated with node 408. Since, layout PL1 has a greater degree of parallelism than layout SL1, PL1 is determined to be the final processing layout for the node 406. Thus, after the forward and backward passes are completed, PL1 is determined to be the final processing layout for node 406, as shown in FIG. 4B.

After the processing layouts have been determined for each of the nodes of dataflow graph 400, as shown in FIG. 4B, the dataflow graph 400 may be configured to perform one or more repartitioning operations. As described herein, the dataflow graph may be configured to perform a repartitioning operation on data records when adjacent nodes in the dataflow graph are configured to perform data processing operations on the data records using processing layouts having different degrees of parallelism. For example, as shown in FIG. 4B, the processing layouts for adjacent nodes 406 (PL1) and 408 (SL1) have different degrees of parallelism.

As discussed herein, in some embodiments, a dataflow graph may be configured to perform a repartitioning operation by adding a new node to the graph representing the repartitioning operation. For example, as illustrated in FIG. 4C, new node 407 representing a merge operation may be added to dataflow graph 400 to obtain dataflow graph 430. When data records are processed in accordance with the dataflow graph having node 407, the data records are merged after being processed using the processing layout PL1 of node 406, but before being output using the processing layout SL1 of node 408. The merging operation may be performed in accordance with the layout SL1 of node 408. In other embodiments, one of the existing nodes (e.g., 406 or 408) may be configured to perform a merge operation instead of adding a new node to dataflow graph 400 to do so.

FIGS. 5A-5D illustrate determining processing layouts for nodes in an illustrative dataflow graph 500 using one or more layout determination rules, in accordance with some embodiments of the technology described herein including the embodiments described with reference to FIG. 2. Among other things, the example of FIGS. 5A-5D illustrates that, in some embodiments, a processing layout may be designated as a layout for a particular node or nodes that is not to be propagated beyond the particular node(s) when determining processing layouts for other nodes.

Figure 5A:
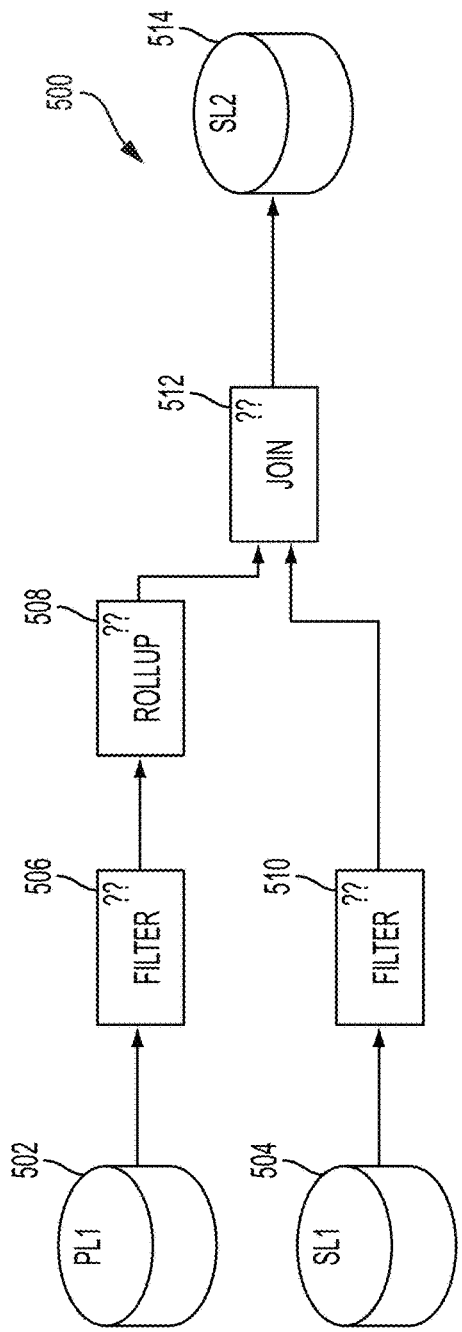
FIGS. 5A-5D illustrate determining processing layouts for nodes of yet another illustrative dataflow graph using one or more layout determination rules, in accordance with some embodiments of the technology described herein.

FIG. 5A illustrates a dataflow graph 500 having: nodes 502 and 504 representing respective input datasets; nodes 506, 508, 510, and 512 representing respective data processing operations; and node 514 representing an output dataset. As may be appreciated from the structure of dataflow graph 500, the input dataset represented by node 502 is first filtered, then a rollup operation is performed on the filtered data and the data records obtained as a result of the rollup operation are joined with a filtered version of the input dataset represented by node 504 prior to being written to the output dataset represented by node 514. In this example, after processing layouts for the input and output datasets are obtained, it may be determined that: parallel processing layout PL1 is to be used for reading data from the input dataset represented by node 502, serial layout SL1 is to be used for reading data from the input dataset represented by node 504, and serial processing layout SL2 is to be used for writing to the output dataset represented by node 514, as shown in FIG. 5A. Additionally, in this example, an indication that the processing layout PL1 is not to be propagated to other nodes may be obtained. This indication may be obtained in any suitable way and, for example, may be obtained from a user via a graphical user interface. At this stage, the processing layouts for the data processing operations represented by the nodes 506, 508, 510, and 512 have not yet been determined.

Figure 5B:
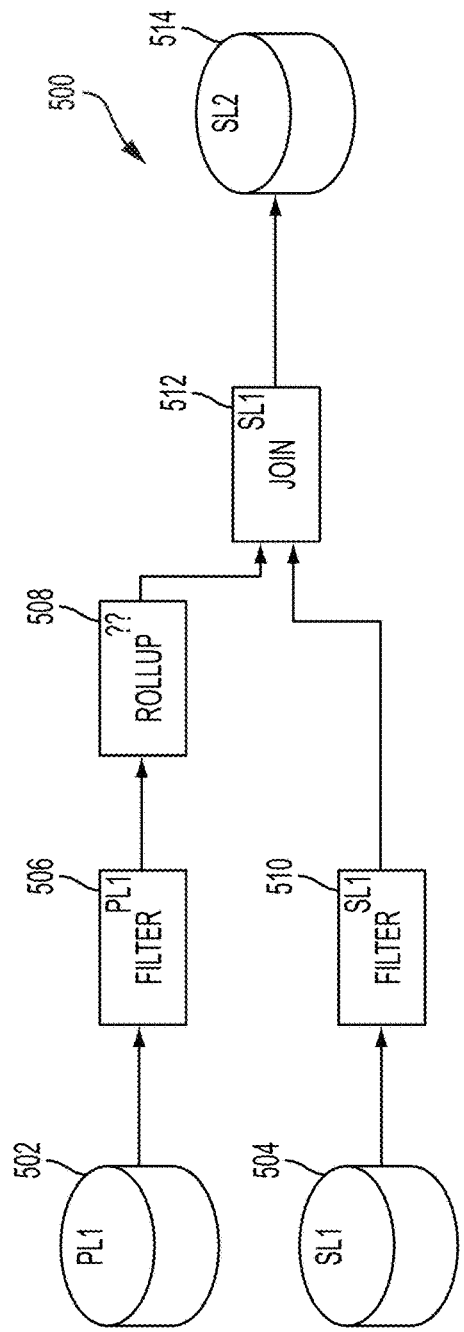
Figure 5C:
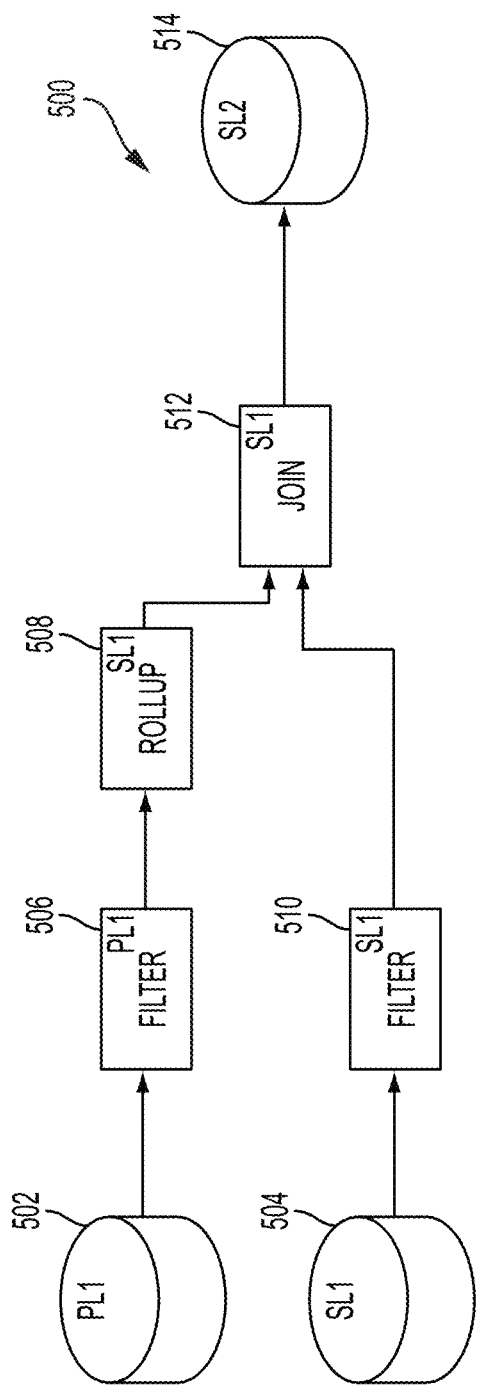
Figure 5D:
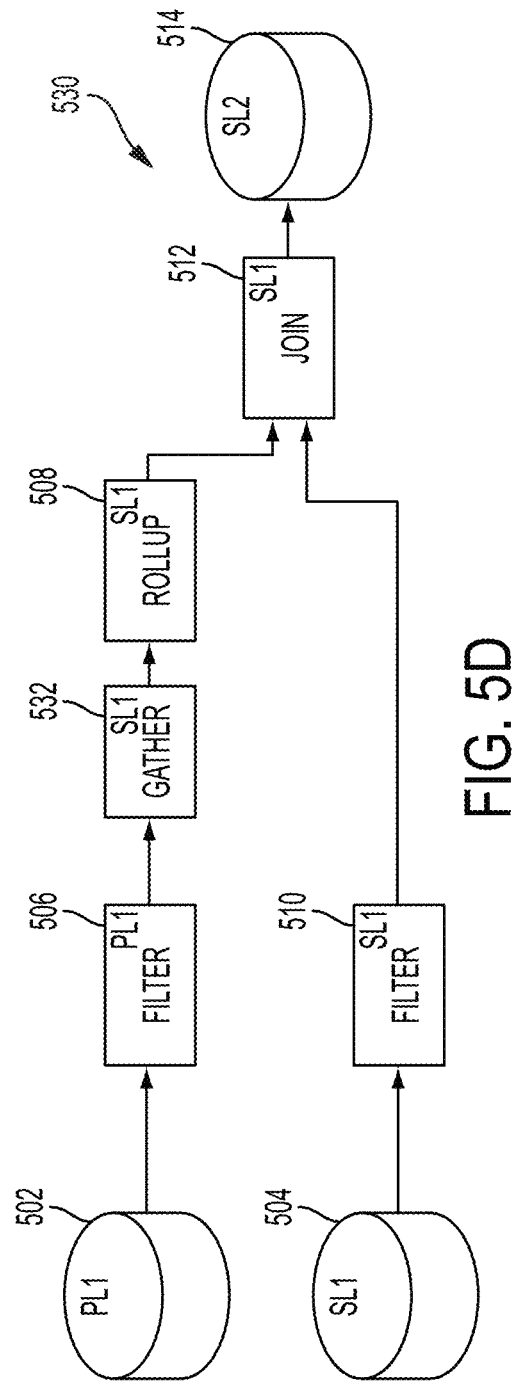

FIGS. 5B and 5C illustrate determining the processing layouts for the data processing operations represented by the nodes 506, 508, 510, and 512 based on the processing layouts obtained for nodes 502, 504, and 514. First, as shown in FIG. 5B, initial processing layouts are determined for nodes 506, 508, 510, and 512 in a forward pass starting from nodes 502 and 504, in accordance with the structure of the dataflow graph 500 and the layout determination rules described herein. In this example, because an indication that the processing layout PL1 for node 502 is not to be propagated has been obtained, the layout PL1 is copied only to the node 506 representing the filtering operation (because the filtering operation is a type of operation that may be performed using the same processing layout, indeed the same computing devices, as the layout used for reading data records from the input dataset represented by node 502), but not to any other nodes such as, for example, the node 508 representing the rollup operation.

Accordingly, during the forward pass, the initial processing layout for node 506 is determined to be PL1, and the initial processing layout for node 508 is not determined because PL1 is not propagated beyond node 506. As discussed below, the processing layout for the node 508 will be determined in the backward pass.

Additionally, during the forward pass, the initial processing layout for node 510 is determined to be the serial layout SL1 of node 504 because there is no node other than node 504 immediately preceding node 510 and there is no layout already associated with node 510. In turn, the initial processing layout SL1 for node 510 is also determined to be the initial processing layout for node 512 because, node 510 is the only node preceding node 512 that is associated with a particular layout (as described above, although node 508 precedes node 512, it is not associated with any initial processing layout). The initial processing layouts determined as a result of a forward pass are illustrated in FIG. 5B. All nodes, except node 508, have been assigned an initial processing layout.

Next, as shown in FIG. 5C, final processing layouts are determined for nodes 506, 508, 510, and 512 in a backward pass starting from node 514, in accordance with the structure of the dataflow graph 500, the initial processing layouts shown in FIG. 5B, and the layout determination rules described herein. For example, the final processing layout for node 512 is determined based on the initial processing layout determined for node 512 and the processing layout associated with node 514. The final processing layout for node 508 is determined based on the final processing layout determined for node 512 (no initial layout has been determined for node 508 in this example). The final processing layout for node 506 is determined based on the initial processing layout determined for node 506 and the final processing layout determined for node 508. The final processing layout for node 510 is determined based on the initial processing layout determined for node 510 and the final processing layout determined for node 512.

In this example, during the backward pass, the final processing layout for node 512 is selected from the initial processing layout SL1 determined for node 512 during the forward pass and the serial processing layout SL2 associated with node 514. As shown in FIG. 5C, the layout SL1 is determined to be the final processing layout for node 512. The final processing layout for node 508 is determined to be the layout SL1, as this is the final determined layout for node 512 and node 508 is not associated with any initial processing layout after the forward pass. The final processing layout for node 506 is determined to be PL1 (the initial layout determined for node 506) because PL1 has a greater degree of parallelism than layout SL1, which is determined to be the final processing layout for node 508. The final processing layout for node 510 is determined to be SL1 since the initial the layout determined for node 510 during the forward pass is SL1 and the final layout determined for node 512 during the backward pass is also SL1.

After the processing layouts have been determined for each of the nodes of dataflow graph 500, as shown in FIG. 5C, the dataflow graph 500 may be configured to perform one or more repartitioning operations. As described herein, the dataflow graph may be configured to perform a repartitioning operation on data records when adjacent nodes in the dataflow graph are configured to perform data processing operations on the data records using processing layouts having different degrees of parallelism. For example, as shown in FIG. 5C, the processing layouts for adjacent nodes 506 (PL1) and 508 (SL1) have different degrees of parallelism.

As discussed herein, in some embodiments, a dataflow graph may be configured to perform a repartitioning operation by adding a new node to the graph representing the repartitioning operation. For example, as illustrated in FIG. 5D, new node 532 representing a merge operation may be added to dataflow graph 500 to obtain dataflow graph 530. When data records are processed in accordance with the dataflow graph having node 532, the data records are gathered after being processed using the processing layout PL1 of node 506, but before being output using the processing layout SL1 of node 508. The gathering operation may be performed in accordance with the layout SL1 of node 508. In other embodiments, one of the existing nodes (e.g., 506 or 508) may be configured to perform a gather operation instead of adding a new node to dataflow graph 500 to do so.

Figure 6:
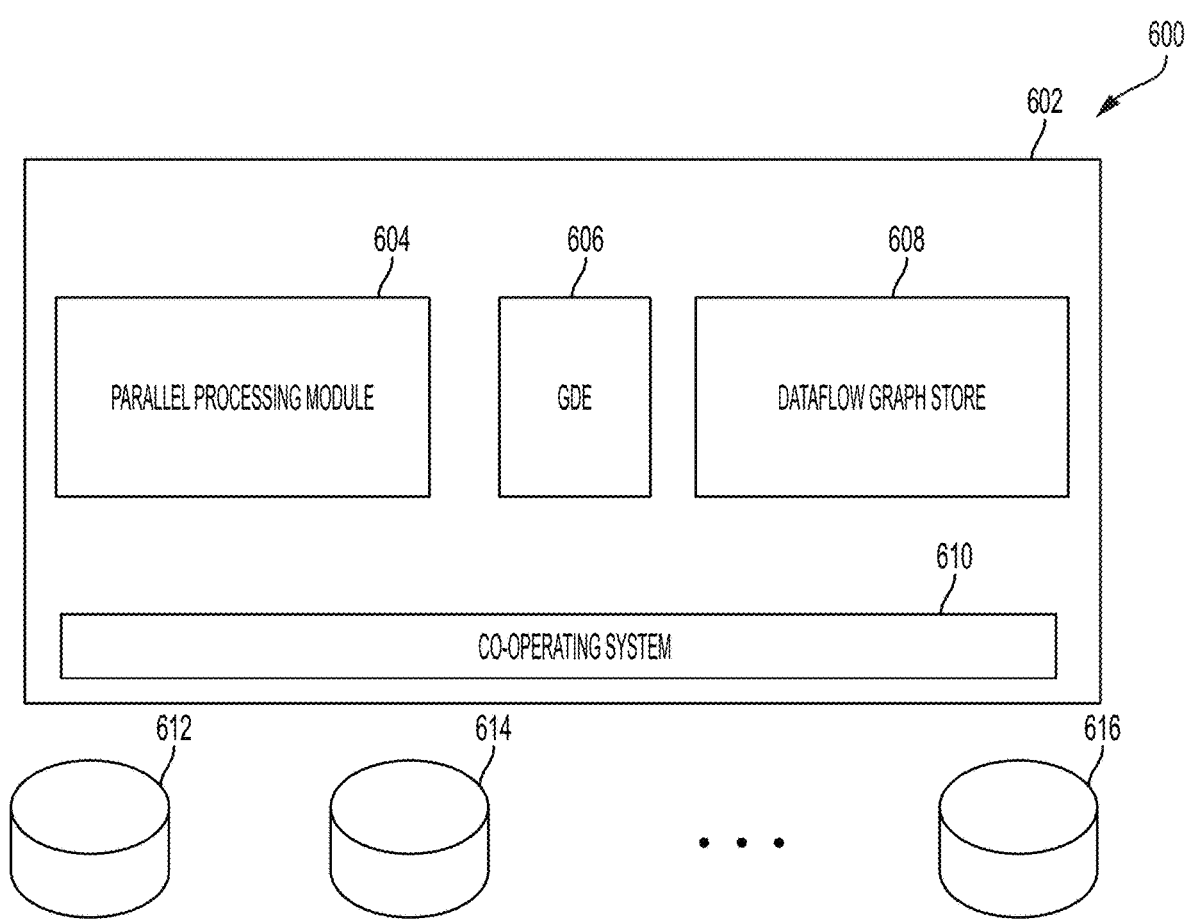
FIG. 6 is a block diagram of an illustrative computing environment, in which some embodiments of the technology described herein may operate.

FIG. 6 is a block diagram of an illustrative computing environment 600, in which some embodiments of the technology described herein may operate. Environment 600 includes data processing system 602, which is configured to access (e.g., read data from and/write data to) data stores 610, 612, 614, and 616. Each of data stores 610, 612, 614, and 616 may store one or more datasets. A data store may store any suitable type of data in any suitable way. A data store may store data as a flat text file, a spreadsheet, using a database system (e.g., a relational database system), or in any other suitable way. In some instances, a data store may store transactional data. For example, a data store may store credit card transactions, phone records data, or bank transactions data. It should be appreciated that data processing system 602 may be configured to access any suitable number of data stores of any suitable type, as aspects of the technology described herein are not limited in this respect.

Data processing system includes a graphical development environment (GDE) 606 that provides an interface for one or more users to create dataflow graphs. The dataflow graphs created using the GDE 606 may be executed using co-operating system 610 or any other suitable execution environment for executing dataflow graphs. Aspects of graphical development environments and environments for executing dataflow graphs are described in U.S. Pat. No. 5,966,072, titled "Executing Computations Expressed as Graphs," and in U.S. Pat. No. 7,716,630, titled "Managing Parameters for Graph-Based Computations," each of which is incorporated by reference herein in its entirety. A dataflow graphs created using GDE 606 or obtained in any other suitable way may be stored in dataflow graph store 608, which is part of data processing system 602.

Data processing system 602 also includes parallel processing module 604, which is configured to determine processing layouts for nodes in a dataflow graph prior to the execution of that dataflow graph by co-operating system 610. The parallel processing module 604 may determine processing layouts for a node in a dataflow graph using any of the techniques described herein including, for example, the techniques described with reference to process 200 of FIG. 2.

Figure 7:
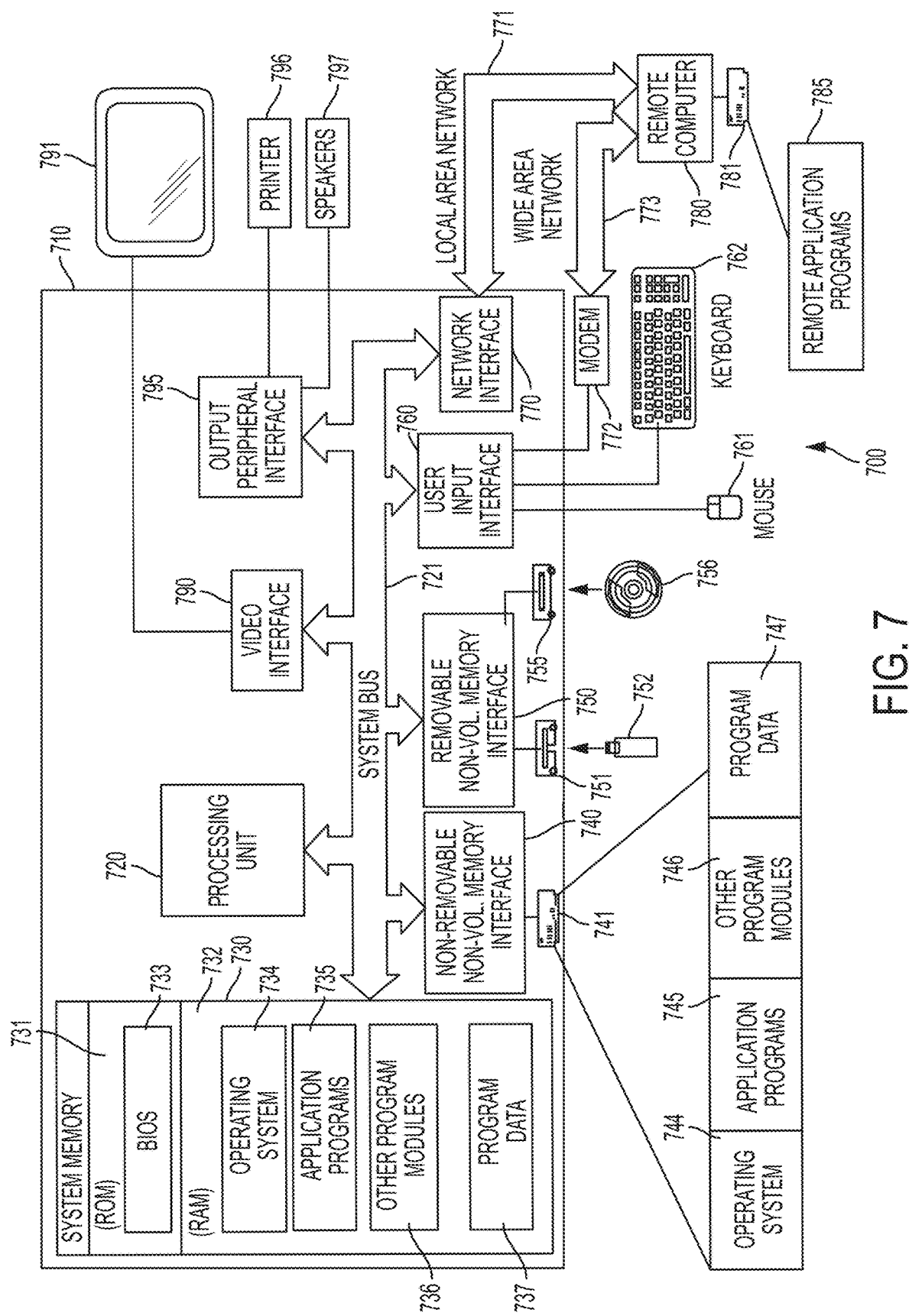
FIG. 7 is a block diagram of an illustrative computing system environment that may be used in implementing some embodiments of the technology described herein.

FIG. 7 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data processing system, comprising:
at least one computer hardware processor; and
at least one non-transitory computer readable storage medium storing processor executable instructions that, when executed by the at least one computer hardware processor, cause the at least one computer hardware processor to perform:
obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising:
a first set of one or more nodes, each node in the first set of nodes representing a respective input dataset in a set of one or more input datasets;
a second set of one or more nodes, each node in the second set of nodes representing a respective output dataset in a set of one or more output datasets; and
a third set of one or more nodes, each node in the third set of nodes representing at least one respective data processing operation;
obtaining a first set of one or more processing layouts for the set of input datasets;
obtaining a second set of one or more processing layouts for the set of output datasets; and
determining a processing layout for each node in the third set of nodes based on the first set of processing layouts, the second set of processing layouts, and one or more layout determination rules including at least one rule for selecting among processing layouts having different degrees of parallelism.

2. The data processing system of claim 1, wherein the set of input datasets includes a first input dataset and a second input dataset, wherein the first set of nodes includes a first node associated with the first input dataset and a second node associated with the second input dataset, and wherein obtaining the first set of one or more processing layouts comprises:
obtaining a first processing layout for reading data from the first input dataset, the first layout at least partially specifying a first degree of parallelism; and
obtaining a second processing layout for reading data from the second input dataset, the second processing layout at least partially specifying a second degree of parallelism different from the at least partially specified first degree of parallelism.

3. The data processing system of claim 1,
wherein the first set of nodes includes a first node associated with a first input dataset in the set of input datasets,
wherein the second set of nodes includes a second node associated with a first output dataset in the set of output datasets,
wherein obtaining the first set of one or more processing layouts comprises obtaining a first processing layout for reading data from the first input dataset, the first processing layout at least partially specifying a first degree of parallelism, and
wherein obtaining the second set of one or more processing layouts comprises obtaining a second processing layout for writing data to the first output dataset, the second processing layout at least partially specifying a second degree of parallelism different from the at least partially specified first degree of parallelism.

4. The data processing system of claim 1, wherein the set of output datasets includes a first output dataset and a second output dataset, wherein the second set of nodes includes a first node associated with the first output dataset and a second node associated with the second output dataset, and wherein obtaining the first set of one or more processing layouts comprises:
obtaining a first processing layout for writing data to the first output dataset, the first layout at least partially specifying a first degree of parallelism; and
obtaining a second processing layout for writing data to the second output dataset, the second processing layout at least partially specifying a second degree of parallelism different from the at least partially specified first degree of parallelism.

5. The data processing system of claim 1, wherein determining a processing layout for each node in the third set of nodes comprises:
determining an initial processing layout for one or more nodes in the third set nodes in a forward pass performed starting from nodes in the first set of nodes in accordance with structure of the dataflow graph and using the first set of processing layouts and the one or more layout determination rules; and
determining a final processing layout for each node in the third set of nodes in a backward pass performed starting from nodes in the second set of nodes in accordance with structure of the dataflow graph and using the second set of processing layouts and the one or more layout determination rules.

6. The data processing system of claim 1, wherein the third set of nodes comprises a first node, wherein the plurality of edges comprises a first edge between the first node and a second node preceding the first node in the dataflow graph, and wherein determining the initial processing layout for each node in the third set nodes comprises:
determining a first initial processing layout for the first node based on a processing layout determined for the second node.

7. The data processing system of claim 6, wherein the plurality of edges comprises a second edge between the first node and a third node preceding the first node in the dataflow graph, wherein a third initial processing layout is associated with the third node, and wherein determining the first initial processing layout for the first node comprises:
selecting one of the second and third processing layouts as the first processing layout.

8. The processing system of claim 7, wherein the second initial processing layout specifies a first degree of parallelism, wherein the third initial processing layout specifies a second degree of parallelism different from the first degree of parallelism, and wherein the selecting comprises:
selecting the second processing layout when the first degree of parallelism is greater than the second degree of parallelism; and
selecting the third processing layout when the first degree of parallelism is less than the second degree of parallelism.

9. The data processing system of claim 7, wherein the second initial processing layout and the third initial processing layout each specifies a same degree of parallelism, wherein the first edge represents a data flow for a first number of data records, wherein the second edge represents a data flow for a second number of data records, and wherein the selecting comprises:

selecting the second processing layout when the first number of data records is greater than the second number of data records; and selecting the third processing layout when the first number of data records is less than the second number of data records.

10. The data processing system of claim 1,
wherein, during the determining, a first processing layout is determined for a first node in third set of nodes, the first processing layout specifying a first degree of parallelism,
wherein a second processing layout for a second node immediately preceding the first node in the graph specifies a second degree of parallelism different from the first degree of parallelism, and
wherein the processor executable instructions further cause the at least one computer hardware processor to configure at least one node of the dataflow graph to perform at least one repartitioning operation.

11. The data processing system of claim 1,
wherein, during the determining, a first processing layout is determined for a first node in third set of nodes, the first processing layout specifying a first degree of parallelism,
wherein a second processing layout for a second node immediately preceding the first node in the graph specifies a second degree of parallelism different from the first degree of parallelism, and
wherein the processor executable instructions further cause the at least one computer hardware processor to add, to the dataflow graph, a new node between the first node and the second node, the new node representing at least one repartitioning operation.

12. The data processing system of claim 10, wherein adding the new node associated with the at least one repartitioning operation comprises adding a node associated with a gather operation, a merge operation, or a partition operation.

13. The data processing system of claim 1, wherein the determining comprises determining a first processing layout for a first node in the third set of nodes, the first node representing a first data processing operation, and wherein determining the first processing layout comprises:
determining a degree of parallelism for performing the first data processing operation; and
identifying a set of one or more computing devices to perform the first data processing operation in accordance with the determined degree of parallelism.

14. The data processing system of claim 13, wherein determining the first processing layout comprises:
determining that a single processor is to be used for performing the first data processing operation; and
identifying a computing device to perform the first data processing operation.

15. The data processing system of claim 1, wherein determining the processing layout is performed using the at least one rule for selecting among processing layouts having different degrees of parallelism.

16. The data processing system of claim 1, wherein the processor-executable instructions cause the at least one computer hardware processor to perform:
after determining the processing layout for each node in the dataflow graph, executing the dataflow graph in accordance with processing layouts determined for each node in the dataflow graph.

17. The data processing system of claim 1, wherein the processor-executable instructions cause the at least one computer hardware processor to perform:
receiving a structured query language (SQL) query;
generating a query plan from the SQL query; and
generating the dataflow graph from the generated query plan.

18. The data processing system of claim 1, wherein determining the processing layout for each node in the third set of nodes comprises:
determining whether adjacent nodes in the third set of nodes were assigned layouts having different degrees of parallelism; and
when it is determined that the adjacent nodes were assigned layouts having different degrees of parallelism, configuring at least one of the adjacent nodes to perform at least one repartitioning operation and/or adding a new node to the dataflow graph configured to perform the at least one repartitioning operation.

19. At least one non-transitory computer readable storage medium storing processor executable instructions that, when executed by at least one computer hardware processor, cause the at least one computer hardware processor to perform:
obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising:
a first set of one or more nodes, each node in the first set of nodes representing a respective input dataset in a set of one or more input datasets;
a second set of one or more nodes, each node in the second set of nodes representing a respective output dataset in a set of one or more output datasets; and
a third set of one or more nodes, each node in the third set of nodes representing at least one respective data processing operation;
obtaining a first set of one or more processing layouts for the set of input datasets;
obtaining a second set of one or more processing layouts for the set of output datasets; and
determining a processing layout for each node in the third set of nodes based on the first set of processing layouts, the second set of processing layouts, and one or more layout determination rules including at least one rule for selecting among processing layouts having different degrees of parallelism.

20. At least one non-transitory computer readable storage medium storing processor executable instructions that, when executed by at least one computer hardware processor, the processor executable instructions comprising:
means for obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising:
a first set of one or more nodes, each node in the first set of nodes representing a respective input dataset in a set of one or more input datasets;
a second set of one or more nodes, each node in the second set of nodes representing a respective output dataset in a set of one or more output datasets; and
a third set of one or more nodes, each node in the third set of nodes representing at least one respective data processing operation;

means for obtaining a first set of one or more processing layouts for the set of input datasets;

means for obtaining a second set of one or more processing layouts for the set of output datasets; and means for determining a processing layout for each node in the third set of nodes based on the first set of processing layouts, the second set of processing layouts, and one or more layout determination rules including at least one rule for selecting among processing layouts having different degrees of parallelism.

21. A method, comprising:

using at least one computer hardware processor to perform:

obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising:

a first set of one or more nodes, each node in the first set of nodes representing a respective input dataset in a set of one or more input datasets;

a second set of one or more nodes, each node in the second set of nodes representing a respective output dataset in a set of one or more output datasets; and a third set of one or more nodes, each node in the third set of nodes representing at least one respective data processing operation;

obtaining a first set of one or more processing layouts for the set of input datasets;

obtaining a second set of one or more processing layouts for the set of output datasets; and determining a processing layout for each node in the third set of nodes based on the first set of processing layouts, the second set of processing layouts, and one or more layout determination rules including at least one rule for selecting among processing layouts having different degrees of parallelism.

22. A data processing system, comprising:

at least one computer hardware processor; and at least one non-transitory computer readable storage medium storing processor executable instructions that, when executed by the at least one computer hardware processor, cause the at least one computer hardware processor to perform:

obtaining information specifying a dataflow graph, the dataflow graph comprising a plurality of nodes and a plurality of edges connecting the plurality nodes, the plurality of edges representing flows of data among nodes in the plurality of nodes, the plurality of nodes comprising:

a first set of one or more nodes; and a second set of one or more nodes disjoint from the first set of nodes;

obtaining a first set of one or more processing layouts for the first set of nodes; and determining a processing layout for each node in the second set of nodes based on the first set of processing layouts and one or more layout determination rules including at least one rule for selecting among processing layouts having different degrees of parallelism.

23. The data processing system of claim 22, wherein the first set of one or more nodes includes:

a set of one or more input nodes, each node in the set of input nodes representing a respective input dataset in a set of one or more input datasets; and a set of one or more output nodes, each node in the set of output nodes representing a respective output dataset in a set of one or more output datasets, and wherein obtaining the first set processing layouts comprises:

obtaining a set of one or more processing layouts for the set of input datasets; and obtaining a set of one or more processing layouts for the set of output datasets.

24. A data processing system, comprising:

at least one computer hardware processor; and at least one non-transitory computer readable storage medium storing processor executable instructions that, when executed by the at least one computer hardware processor, cause the at least one computer hardware processor to perform:

obtaining computer code that, when executed by the at least one computer hardware processor, causes the at least one computer hardware processor to execute a database query, wherein the computer code comprises:

a first set of one or more computer code portions each representing a data processing operation for reading in a respective input dataset;

a second set of one or more computer code portions each representing a data processing operation for writing out a respective output dataset;

a third set of one or more computer code portions each representing a respective data processing operation;

obtaining a first set of one or more processing layouts for one or more code portions in the first set of code portions;

obtaining a second set of one or more processing layouts for one or more code portions in the second set of code portions; and determining a processing layout for each code portion in the third set of code portions based on the first set of processing layouts, the second set of processing layouts, and one or more layout determination rules including at least one rule for selecting among processing layouts having different degrees of parallelism.

25. The data processing system of claim 24, wherein the determining is performed further based on information at least partially indicating an order of execution of at least some computer code portions in the computer code.

26. The data processing system of claim 24, wherein the computer code is associated with a dataflow graph, wherein the dataflow graph comprises a plurality of nodes and a plurality of edges connecting the plurality nodes, the plurality of edges representing flows of data among nodes in the plurality of nodes, and wherein computer code portions in the computer code are associated with respective nodes in the dataflow graph.

27. The data processing system of claim 26, wherein the plurality of nodes comprises:

a first set of one or more nodes, each node in the first set of nodes representing a respective input dataset, wherein each computer code portion in the first set of computer code portions is associated with a respective node in the first set of nodes;

a second set of one or more nodes, each node in the second set of nodes representing a respective output dataset, wherein each computer code portion in the second set of computer code portions is associated with a respective node in the second set of nodes; and a third set of one or more nodes, each node in the third set of nodes representing a respective data processing operation.

28. The data processing system of claim 24, wherein determining the processing layout is performed using the at least one rule for selecting among processing layouts having different degrees of parallelism.

29. The data processing system of claim 26, wherein the processor-executable instructions cause the at least one computer hardware processor to perform:

after determining the processing layout for each node in the dataflow graph, executing the dataflow graph in accordance with processing layouts determined for each node in the dataflow graph.

30. The data processing system of claim 24, wherein the processor-executable instructions cause the at least one computer hardware processor to perform:

receiving a structured query language (SQL) query;
generating a query plan from the SQL query; and
generating the computer code from the query plan.

* * * * *